(12) United States Patent
Guey

(10) Patent No.: US 8,295,325 B2
(45) Date of Patent: *Oct. 23, 2012

(54) SIGNATURE SEQUENCES AND METHODS FOR TIME-FREQUENCY SELECTIVE CHANNEL

(75) Inventor: Jiann-Ching Guey, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1181 days.

This patent is subject to a terminal disclaimer.

(21) Appl. No.: 11/760,654

(22) Filed: Jun. 8, 2007

(65) Prior Publication Data

US 2008/0170608 A1    Jul. 17, 2008

Related U.S. Application Data

(60) Provisional application No. 60/884,703, filed on Jan. 12, 2007.

(51) Int. Cl.
*H04B 1/707* (2011.01)
(52) U.S. Cl. .... 375/145; 375/146; 375/149; 375/E1.005
(58) Field of Classification Search .......... 375/140–153, 375/E1.005
See application file for complete search history.

(56) References Cited

U.S. PATENT DOCUMENTS

| | | | |
|---|---|---|---|
| 5,537,397 A * | 7/1996 | Abramson | 370/441 |
| 6,088,416 A | 7/2000 | Perahia et al. | |
| 6,407,699 B1 * | 6/2002 | Yang | 342/357.59 |
| 6,671,309 B1 | 12/2003 | Craig et al. | |
| 6,842,487 B1 | 1/2005 | Larsson | |
| 6,990,153 B1 | 1/2006 | Farhang-Boroujeni et al. | |
| 7,248,559 B2 | 7/2007 | Ma et al. | |
| 7,433,419 B2 | 10/2008 | Yun et al. | |
| 7,634,033 B1 * | 12/2009 | Giallorenzi et al. | 375/350 |
| 2001/0033606 A1 * | 10/2001 | Akopian et al. | 375/149 |
| 2001/0043644 A1 * | 11/2001 | Dooley et al. | 375/150 |

(Continued)

OTHER PUBLICATIONS

U.S. Office Action mailed Feb. 5, 2009 in related U.S. Appl. No. 11/292,415.

(Continued)

*Primary Examiner* — Shuwang Liu
*Assistant Examiner* — David Huang
(74) *Attorney, Agent, or Firm* — Nixon & Vanderhye, P.C.

(57) ABSTRACT

A signature sequence employed in a wireless transmission over a channel is detected and utilized. The signature sequence is selected from a set of sequences formed by delay-Doppler shifts of a base sequence. Preferably but not exclusively, the set of sequences is formed by circular delay-Doppler shifts of the base sequence. The base sequence can be, for example, an m-sequence. A received signal is obtained from a received wireless transmission. A candidate sequence selector (90) selects a candidate sequence from among a set of sequences for evaluation as the signature sequence, the set of sequences having been formed by sequence set generator (88) as delay-Doppler shifts of a base sequence. An image former (82) uses the base sequence and the received signal to form a delay-Doppler image with respect to an image area pertinent to the candidate sequence. A metric analyzer (84) computes a metric over the image area pertinent to the candidate sequence and uses the metric to determine if the signature sequence is the candidate sequence. A sequence utilization device (76) can use the signature sequence to identify another transceiver unit which sent the wireless transmission, and/or use the signature sequence for synchronization with another transceiver unit which sent the wireless transmission.

6 Claims, 16 Drawing Sheets

U.S. PATENT DOCUMENTS

| | | | |
|---|---|---|---|
| 2003/0147480 A1* | 8/2003 | Richards et al. | 375/343 |
| 2004/0095902 A1 | 5/2004 | Laroia et al. | |
| 2004/0257979 A1 | 12/2004 | Ro et al. | |
| 2005/0147024 A1 | 7/2005 | Jung et al. | |
| 2006/0039318 A1 | 2/2006 | Oh et al. | |
| 2006/0045001 A1 | 3/2006 | Jalali | |
| 2007/0036179 A1 | 2/2007 | Palanki et al. | |
| 2007/0053282 A1 | 3/2007 | Tong et al. | |
| 2007/0127553 A1* | 6/2007 | Miller et al. | 375/130 |
| 2007/0133642 A1 | 6/2007 | Guey | |
| 2008/0310484 A1 | 12/2008 | Shattil | |

OTHER PUBLICATIONS

Riga, "CDD-Based Precoding for E-UTRA Downlink MIMO", R1-063345, 3GPP TSG RAN WGI Meeting #47, Nov. 6-10, 2006.

Bauch et al, "Parameter Optimization, Interleaving and Multiple Access in OFDM with Cyclic Delay Diversity", 0-7803-8255-2/04, 2004, IEEEE, pp. 505-509.

Lodhi et al, "Performance Comparison of Space-Time Block Coded and Cyclic Delay Diversity MC-CDMA Systems", IEEE Wireless Communication, Apr. 2005, pp. 38-45.

International Search Report and Written Opinion mailed Jul. 8, 2008 in corresponding PCT application PCT/SE2007/051027.

Chang et al, "Frequency Coded Waveforms for Enhanced Delay-Doppler Resolution", IEEE Transactions on Information Theory, vol. 49, No. 11, 2003, pp. 2960-2971.

Ham et al, "Inverse Filtering in the Presence of Doppler with Application to Specular Multipath Parameter Estimation", 1995 International Conference on Acoustics, Speech, and Signal Processing, 1995, vol. 5, pp. 3167-3170.

Guey et al, "Synchronization Signal Design for OFDM Based on Time-Frequency Hopping Patterns", Conference on Communications, IEEE Communications Society, 2007, pp. 4329-4334.

Benedetto et al, "International Conference on Concatenating Codes for Improved Ambiguity Behavior", Electromagnetics in Advanced Applications, 2007, pp. 464-467.

U.S. Appl. No. 11/760,659, filed Jun. 8, 2007, entitled "Method and Apparatus for Complexity Reduction for Detection of Delay and Doppler Shifted Signature Sequences".

Popovic et al, "User Traffic Multiplexing on OFDM Downlink", Spread Spectrum Techniques and Applications, 2004, IEEE Eighth Int'l. Symposium, Aug. 30-Sep. 2, 2004, pp. 429-433.

International Search Report and Written Opinion mailed May 16, 2007 in corresponding PCT application PCT/SE2006/050455.

U.S. Office Action mailed Feb. 16, 2011 in related U.S. Appl. No. 11/760,659.

Popovic, "Spreading Sequences for Multi-Carrier CDMA Systems," IEE Colloquium on CDMA Techniques and Applications for Third Generation Mobile Systems, May 19, 1997.

TSG-RAN WG1 #44bis, "E-UTR4 Random Access Preamble Design," R1-060998, Athens, Greece, Mar. 27-31, 2006.

Proakis, "Digital Communications 2nd edition." McGraw-Hill, 1989, pp. 834-835.

Guey, "The Design and Detection of Signature Sequences for Slot-Aligned System in Time-Frequency Selective Channel", Sep. 13, 2006.

Guey, "Optimal Detection of Time-Frequency Hopping Patterns in OFDM", Nov. 3, 2005.

Guey, "Pilot Pattern Design for OFDM", May 10, 2005.

Final Office Action mailed Aug. 8, 2011 in U.S. Appl. No. 11/760,659.

* cited by examiner

Fig. 8 ical patent application 60/884,703, filed Jan. 12,
SIGNATURE SEQUENCES AND METHODS FOR TIME-FREQUENCY SELECTIVE CHANNEL This application claims the benefit and priority of U.S. provisional patent application 60/884,703, filed Jan. 12, 2007, entitled "A NOVEL SIGNATURE SEQUENCE DESIGN FOR TIME-FREQUENCY SELECTIVE CHANNEL", which is incorporated by reference herein in its entirety. This application is related to simultaneously-filed U.S. patent application Ser. No. 11/760,659, entitled "METHOD AND APPARATUS FOR COMPLEXITY REDUCTION FOR DETECTION OF DELAY AND DOPPLER SHIFTED SIGNATURE SEQUENCES", and U.S. patent application Ser. No. 11/292,415, filed Dec. 2, 2005, entitled "HOPPING PILOT PATTERN FOR TELECOMMUNICATIONS, both of which are incorporated by reference herein in their entirety.

BACKGROUND

I. Technical Field

This invention pertains to wireless telecommunications, and particularly to detection of information transmitted over a radio interface.

II. Related Art and Other Considerations

In a typical cellular radio system, a wireless terminal communicates via a radio access network (RAN) to one or more core networks. The wireless terminal can be a mobile station (also termed "user equipment unit" ("UE") or "mobile terminal") such as a mobile telephone ("cellular" telephone) and laptop with mobile termination, and thus can be, for example, a portable, pocket, hand-held, computer-included, or car-mounted mobile device which communicates voice and/or data with the radio access network. Alternatively, the wireless terminal can be a fixed wireless device, e.g., fixed cellular devices/terminal which is part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the wireless terminal within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

Thus, wireless communications involve transmission of information over an air or radio interface from a transmitter station to a receiver station. For example, a mobile transmitter station (e.g., mobile station) may send a message on an uplink channel to a receiver unit such as a base station. Conversely, a transmitter unit in the form of a base station may send a message on a downlink channel to a receiver of a mobile station, or even to receivers in plural mobile stations.

In some instances a transmission between stations includes a particular sequence of samples. The sequence can be used to identify a particular transmitting station and/or to facilitate synchronization between the transmitting unit of one station and the receiving unit of another station. When associated for such purposes with a particular station, the sequence is known as a "signature sequence". For example, a base station may have a particular signature sequence included in certain transmissions to distinguish that particular base station from other base stations whose signals may be also be received by mobile stations. Similarly, a mobile station may be assigned a certain signature sequence, at least temporarily (e.g., per connection, while in a specified cell), so that when the signature sequence is included in a wireless transmission on the uplink to a base station node, the base station node can determine that the transmissions emanated from that mobile station rather than other mobile stations in the cell of the base station node.

The design of signature sequences with small auto and cross correlation has been studied in a wide range of applications including wireless communication and radar. Of particular interest in wireless communication is the need to design a large number of unique sequences for the purpose of synchronization and device identification, as briefly mentioned above. Examples include the Barker sequence, chirp-like sequences, the m-sequence, and the Gold sequence derived from it. In radar signal design, there is also a wealth of literature on sequences with good properties for the detection of targets with different delay-Doppler shifts.

The general principle of introducing delay-Doppler shift to a base sequence for identification purpose has been disclosed in U.S. patent application Ser. No. 11/292,415, filed Dec. 2, 2005, entitled "HOPPING PILOT PATTERN FOR TELE-COMMUNICATIONS, which is incorporated by reference herein in its entirety.

The ability of a pair of signature sequences to be distinguished from each other is often measured by their cross correlation function defined by Expression (1), in which N is the sequence length.

$$\sum_{n=0}^{N-1} s_o[n] s_1^*[n], \qquad (1)$$

In a time-dispersive (frequency selective) channel, a good signature sequence also needs to be able to distinguish itself from its multipath echos. This is measured by its auto correlation function defined by Expression (2) for $\tau=0, \ldots N-1$.

$$\sum_{n=0}^{N-1} s_o[n] s_0^*[n-\tau], \qquad (2)$$

Unless otherwise specified, all the indexing or offsetting utilized herein is modulo N. This results in the circular operations that can be achieved in practice by introducing cyclic prefix of appropriate length commonly seen in an OFDM system.

Therefore, the most commonly used metric for sequence design in a time-dispersive channel is simply the cross correlation function defined as by Expression (3).

$$\phi_{s_o, s_1}[\tau] \equiv \sum_{n=0}^{N-1} s_o[n] s_1^*[n-\tau]. \qquad (3)$$

In the case where $s_0[n]=s_1[n]$, the cross-correlation function becomes an auto correlation function. A good sequence set should then have small cross correlation between any pair of sequences at all lags and small auto correlation at non-zero lag for all individual sequences. In cases where the system is synchronized up to the sequence length, the same sequence can be circularly shifted and assigned to more than one device as long as the relative circular shifts are more than the channel's maximum delay spread. The common pilot code for CDMA2000 is such an example.

One example of sequence set with good auto and cross correlation function is the Zadoff-Chu sequence described in B. M. Popovic, "Spreading Sequences for Multi-Carrier CDMA Systems," IEEE Colloquium on CDMA Technologies and Applications for Third Generation Mobile Systems, May 19, 1997, incorporated by reference herein, and defined by Expression (4).

$$s_u[n] = \exp\left\{-j2\pi u \frac{n(n+1)}{2N}\right\}, \quad (4)$$

In Expression (4), n=0,1, ..., N−1 and the sequence index u also ranges from 0 to N−1. The auto correlation function of any individual Zadoff-Chu sequence is zero except for the zero lag where it is N and the cross correlation between any pair of distinctive Zadoff-Chu sequences is $\sqrt{N}$ for all lags. For identification, a device may be assigned a unique sequence index u and a circular shift k, as proposed to the Long Term Evolution in 3GPP, "E-UTRA Random Access Preamble Design", TSG-RAN WG1 #44bis, R1-060998, Athens, Greece, Mar. 27-31, 2006, incorporated herein by reference.

Another example is the set of N+2 Gold sequences derived from a pair of preferred m-sequences with a maximum cross-correlation of $\sqrt{2N}$ and described in J. G. Proakis, "Digital Communications 2nd Edition," McGraw Hill, 1989, pp. 834-835, incorporated herein by reference.

The good correlation properties of the existing designs described above are valid only when there is no frequency uncertainty in the communication environment. In reality, the channel may be time-selective (or frequency dispersive) due to Doppler spread. There may also be frequency offset among the communication devices due to unsynchronized oscillators. These frequency uncertainties, together with the channel's time dispersion, are best described by the (noiseless) received signal at the channel output given by expression (5).

$$r[n] = \sum_{\tau=0}^{\tau_{max}-1} \sum_{v=0}^{v_{max}-1} h[\tau, v]s[n-\tau]e^{j\frac{2\pi vn}{N}} \quad (5)$$

In Expression (5), h(τ,v) is the channel's delay-Doppler response with maximum delay-Doppler spread ($\tau_{max}$, $v_{max}$). Note that the frequency offset is incorporated into the Doppler spread of the channel.

To detect the sequence, the receiver then needs to match the received signal with a hypothesis of the unknown delay-Doppler spread. This is accomplished by the two-dimensional delay-Doppler correlator given by Expression (6).

$$I[\tau, v] = \sum_{n=0}^{N-1} r[n]s^*[n-\tau]e^{-j\frac{2\pi vn}{N}} \quad (6)$$

$$= \sum_{\tau'=0}^{N-1} \sum_{v'=0}^{N-1} e^{j2\pi(v-v')\tau'} h[\tau', v']X_s[\tau-\tau', v-v'],$$

$$X_s[\tau, v] = \sum_{n=0}^{N-1} s[n]s^*[n-\tau]e^{-j\frac{2\pi vn}{N}} \quad (7)$$

In Expression (6), Expression (7) is the (circular) ambiguity function.

Therefore, the measure of a sequence's ability to be uniquely identified in a time-frequency selective channel should be the two-dimensional ambiguity function given by Expression (7). An ideal sequence should have an ambiguity function resembling a thumbtack with sharp peak at the origin and an evenly distributed low sidelobe. The one-dimension auto and cross correlation functions conventionally used for measuring signature sequence properties fail to reveal the sequence's characteristics in the presence of frequency uncertainty.

FIG. 16 shows an ambiguity function of a length N=29 Zadoff-Chu sequence with u=6. It is clear that for v=0 (no frequency uncertainty), the correlation property is ideal. However, there are two peaks at (τ=24, v=1) and (τ=5, v=28). This implies that the sequence is identical to itself shifted in time and frequency by the corresponding amounts. Therefore, if there is a frequency uncertainty of ±1/N it is impossible to determine if the peaks detected around τ=24 and τ=5 correspond to the self image of a sequence with zero time-frequency shift or another device assigned a circular shift of τ=5 or τ=24.

The ambiguity function of a Gold sequence is not as bad as a Zadoff-Chu sequence. However, there are only N+2 sequences in the set and the maximum cross correlation value $\sqrt{2N}$ is worse than that of the Zadoff-Chu sequence.

What is desired, therefore, and an object of the present invention, are improved method, apparatus, system, and techniques for forming and detecting a signature sequence.

BRIEF SUMMARY

Aspects of the technology pertain to utilization and/or detection of a signature sequence employed in a wireless transmission over a channel. The signature sequence is selected from a set of sequences formed by delay-Doppler shifts of a base sequence. Preferably but not exclusively, the set of sequences is formed by circular delay-Doppler shifts of the base sequence. The base sequence can be, for example, an m-sequence.

In one example implementation in which (l,m) is an index associated with the selected sequence, the set of sequences is represented by $$s_{l,m}[n] = s[n - l\tau_d]e^{j\frac{2\pi m v_d n}{N}},$$

wherein N is a length of the base sequence s[n], wherein ($\tau_d$, $v_d$) is a minimum delay-Doppler separation between any pair of derived sequences, and wherein the minimum delay-Doppler ($\tau_d$, $v_d$) separation is chosen to be greater than a maximum delay-Doppler spread of the channel.

In one of its aspects, the technology concerns a transceiver unit configured to use the signature sequence in conjunction with wireless transmission over a channel. In one example embodiment, the transceiver unit is configured to utilize the signature sequence for synchronization of the wireless transmission with another transceiver unit. In another example embodiment, the transceiver unit is configured to utilize the signature sequence for identification of the another transceiver unit.

In one example implementation, the transceiver unit comprises a base station node which receives the wireless transmission from a wireless terminal which is configured to include the signature sequence in the wireless transmission for transmission to the base station node. In another example implementation, the transceiver unit comprises a wireless terminal which receives the wireless transmission from a base station configured to include the signature sequence in the wireless transmission and to transmit the wireless transmission to the wireless terminal.

In an example implementation, the transceiver unit comprises a transceiver; a hypothesis sequence selector; an image former; and a metric analyzer. The transceiver is configured to obtain a received signal from the wireless transmission comprising the signature sequence. The hypothesis sequence selector is configured to select a candidate sequence from among the set of sequences for evaluation as the signature sequence. The image former is configured to use the base sequence and the received signal to form a delay-Doppler image with respect to an image area pertinent to the candidate sequence. The metric analyzer is configured to compute a metric over the image area pertinent to the candidate sequence and to use the metric to determine if the signature sequence is the candidate sequence.

The transceiver unit can further comprise a signature sequence utilizer. The signature sequence utilizer can comprising, for example, an identification unit configured to identify another transceiver unit which sent the wireless transmission or a synchronization unit configured to promote synchronization between the transceiver unit and the another transceiver unit.

In another of its aspects the technology concerns a method of operating a wireless network. The method comprises obtaining, at a transceiver unit, a received signal from a received wireless transmission; selecting a candidate sequence from among a set of sequences for evaluation as the signature sequence (the set of sequences having been formed by delay-Doppler shifts of a base sequence); using the base sequence and the received signal to form a delay-Doppler image with respect to an image area pertinent to the candidate sequence; computing a metric over the image area pertinent to the candidate sequence; and, using the metric to determine if the signature sequence is the candidate sequence.

The method can further comprising using the signature sequence to identify another transceiver unit which sent the wireless transmission, and/or using the signature sequence for synchronization with another transceiver unit which sent the wireless transmission.

In an example mode wherein the transceiver unit comprises a wireless terminal, and the method further comprises transmitting the wireless transmission including the signature sequence from a base station node to the wireless terminal. In another example mode wherein the transceiver unit comprises a base station node, the method further comprises transmitting the wireless transmission including the signature sequence from a wireless terminal to the base station node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8 is a diagrammatic view illustrating in contrasting fashion both a circular shifting case and a non-circular case.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In various aspects the technology pertains to utilization and/or detection of a signature sequence employed in a wireless transmission over a channel. Two non-limiting, distinct example scenarios depicting example uses of a signature sequence are shown in FIG. 1 and FIG. 2.

Figure 1:
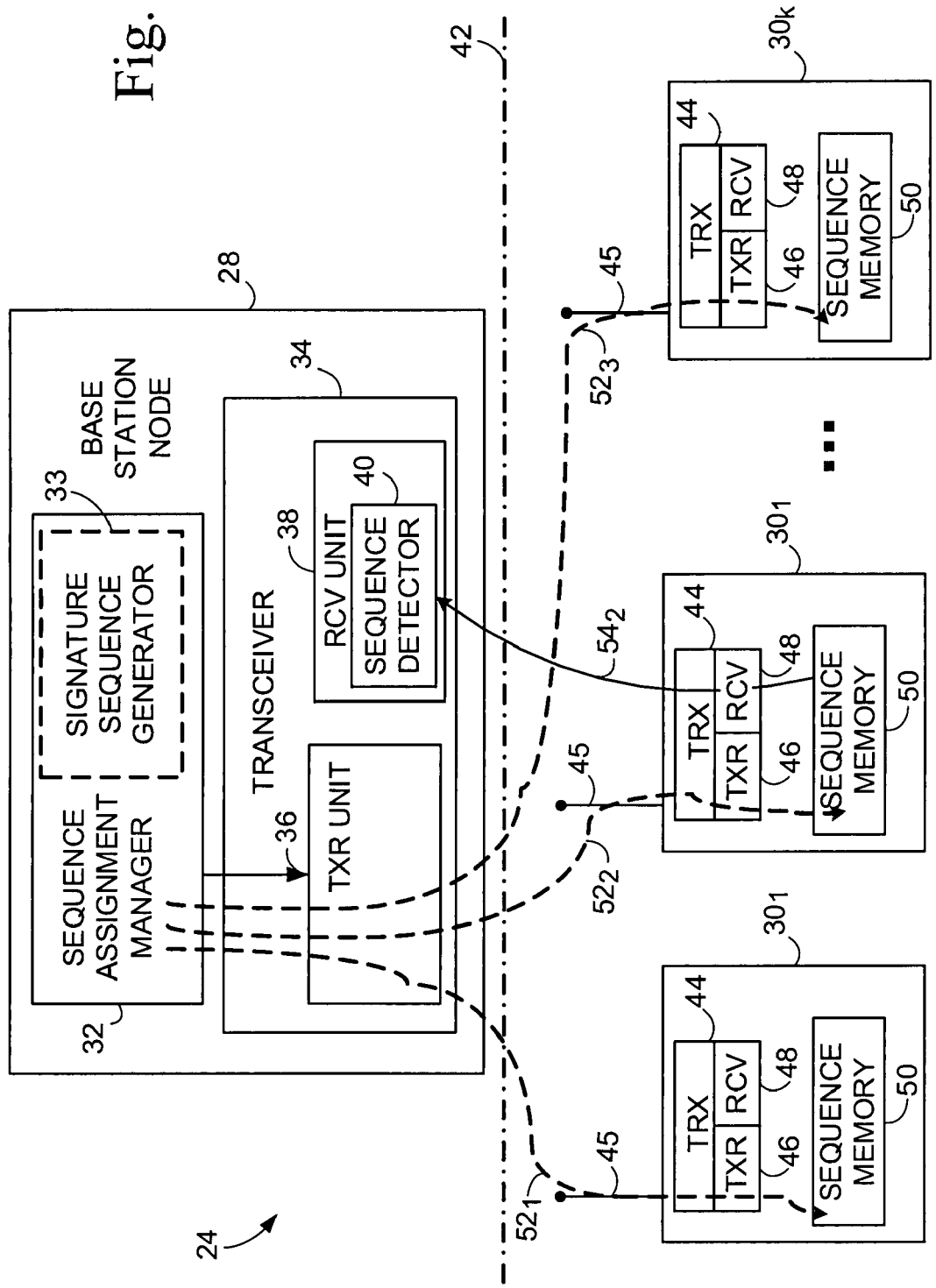
FIG. 1 is a diagrammatic view of a radio access network showing a base station node comprising a sequence detector for determining a signature sequence transmitted by one or more wireless terminals.
Figure 2:
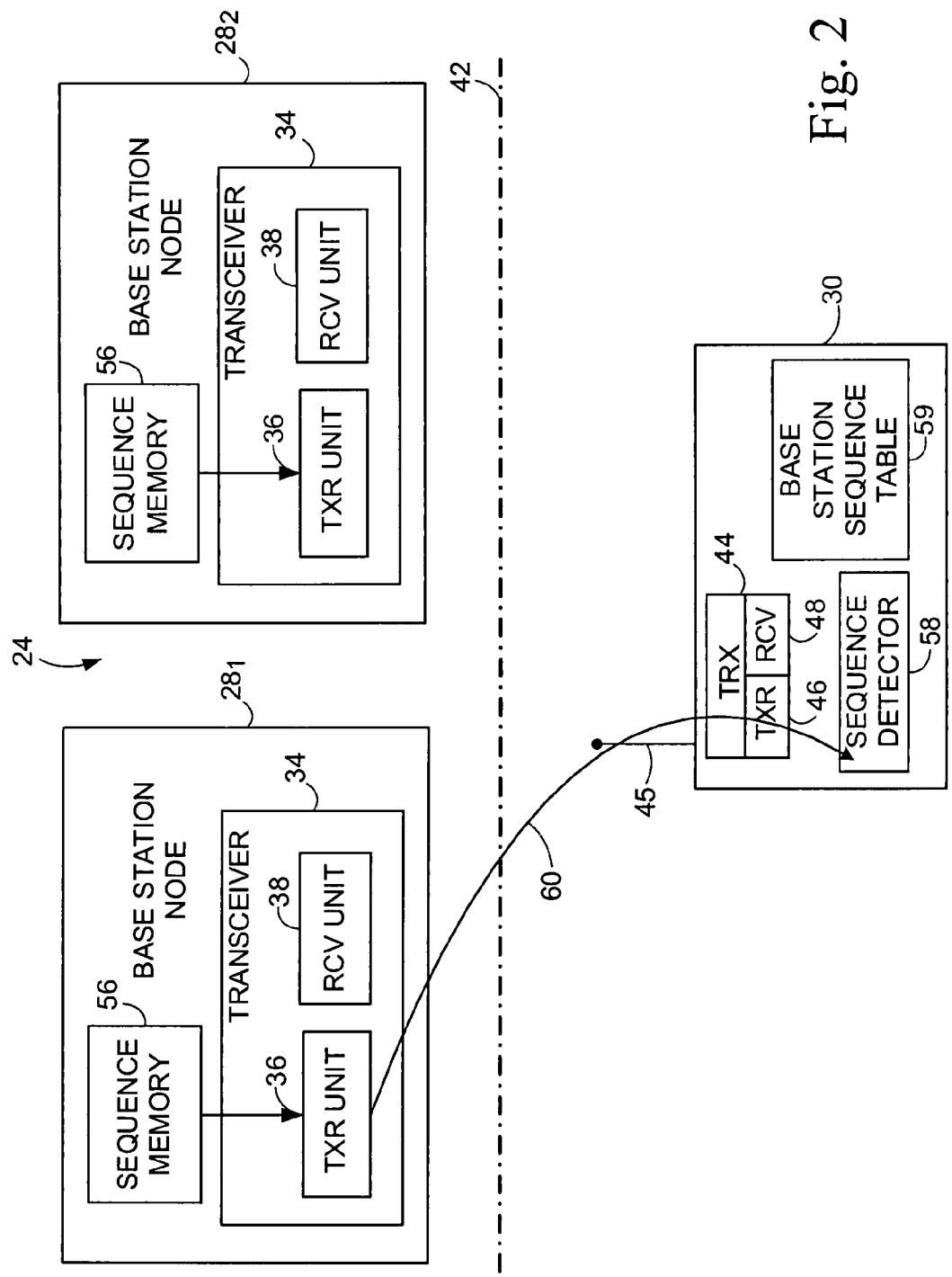
FIG. 2 is a diagrammatic view of a radio access network showing a wireless terminal comprising a sequence detector for determining a signature sequence transmitted by one or more base station nodes.

FIG. 1 depicts a first example scenario of use of a signature sequence in a radio access network 24 comprising a base station node 28 and wireless terminals $30_1$-$30_k$. The base station node 28, or another network node, comprises a sequence assignment manager 32. Sequence assignment manager 32 in turn can optionally include signature sequence generator 33. Base station node 28 further comprises one or more transceivers 34. Each transceiver 34 comprises transmitting unit 36 and receiving unit 38. The receiving unit 38 comprises signature sequence detector 40.

Each wireless terminal 30 comprises transceiver 44 which is connected to antenna 45. Each transceiver 44 in turn comprises transmitting unit 46 and receiving unit 48. Each wireless terminal 30 further comprises a signature sequence memory 50.

The sequence assignment manager 32 serves to assign a signature sequence (preferably a unique sequence) to each of the wireless terminals $30_1$-$30_k$. The signature sequence is usually temporarily assigned, e.g., the signature sequence is assigned at call setup for duration of a connection involving the wireless terminal 30, or possibly while the wireless terminal 30 resides in a cell served by base station node 28. Once assigned, the signature sequence for a particular wireless terminal 30 is transmitted by transmitting unit 36 of base station node 28 over air interface 42 to the particular wireless terminal 30. For example, FIG. 1 depicts by arrow $52_1$ the assignment of a unique signature sequence and transmission of that unique signature sequence to wireless terminal $30_1$; FIG. 1 depicts by arrow $52_2$ the assignment of a unique signature sequence and transmission of that unique signature sequence to wireless terminal $30_2$; and so forth. Upon receipt of its assigned signature sequence, each wireless terminal 30 stores its assigned signature sequence in signature sequence memory 50.

FIG. 1 further depicts by arrow 54 the generation and transmission of a message or wireless transmission from wireless terminal $30_2$ to base station node 28. The particular message indicated by arrow 54 includes the signature sequence of wireless terminal $30_2$. To this end, the signature sequence assigned to wireless terminal $30_2$ is fetched from signature sequence memory 50 for inclusion in the message. The message (which includes the signature sequence for wireless terminal $30_2$) is transmitted by transmitting unit 46 of wireless terminal $30_2$ over air interface 42 to base station node 28. At base station node 28 the sequence detector 40 comprising receiving unit 38 analyzes the receiving signal and detects the signature sequence included in the message. The signature sequence detected by sequence detector 40 is then used for any of several purposes, e.g., to determine the particular wireless terminal from which the message of arrow 54 emanated. The base station node 28 is typically receiving messages from plural wireless terminals, and can receive such messages essentially simultaneously. Thus the signature sequence can serve as a needed factor in distinguishing from which wireless terminal a particular message was transmitted. Upon detecting the signature sequence in the received signal, the signature sequence memory 50 can consult sequence assignment manager 32 to obtain the identity of the particular wireless terminal 30 which transmitted the message. In another implementation, the signature sequence included in the message depicted by arrow 54 can be used alternatively or additionally for synchronization between base station node 28 and wireless terminal $30_2$.

FIG. 2 depicts a second example scenario of use of a signature sequence, and for sake of simplification shows essentially the same a radio access network 24. As such, structural elements common to both FIG. 1 and FIG. 2 have like reference descriptors. FIG. 2 illustrates the fact that radio access network 24 typically comprises plural base station nodes, e.g., base station node $28_1$ and base station node $28_2$. It will be appreciated that the radio access network 24 can comprise more than two base station nodes, only two such nodes being show for sake of simplicity in FIG. 2. FIG. 2 shows that each base station node 28 further comprises a signature sequence memory 56 in which a (preferably unique) signature sequence associated with or assigned to the base station node is stored. Further, a representative wireless terminal 30 of FIG. 2 further comprises sequence detector 58 and base station sequence table 59. The base station sequence table 59 stores an association of signature sequences with respective base station nodes, e.g., stores the signature sequence for base station node $28_1$ in a manner such that the signature sequence for base station node $28_1$ is associated with base station node $28_1$, and stores the signature sequence for base station node $28_2$ in a manner such that the signature sequence for base station node $28_2$ is associated with base station node $28_2$. For example, base station sequence table 59 can be a table stored in memory for associating a particular signature sequence with the base station node to which the signature sequence is assigned.

In the FIG. 2 scenario, a base station node such as base station node $28_1$ transmits a message or wireless transmission over air interface 42 to wireless terminal 30, as depicted by arrow 60. The particular message of arrow 60 includes the signature sequence assigned to base station node $28_1$ and stored in signature sequence memory 56 of base station node $28_1$. Upon reception by transceiver 44 of wireless terminal 30, the received message of arrow 60 is analyzed by sequence detector 58 to obtain the signature sequence included therein. Once the signature sequence included in the message of arrow 60 is detected by sequence detector 58, the base station sequence table 59 is consulted to determined from which base station node 28 the message emanated.

The ensuing discussion concerns the content and use of the signature sequence, including use of a signature sequence included in a received signal by a sequence detector such as sequence detector 40 of base station node 28 in the scenario of FIG. 1 and sequence detector 58 of wireless terminal 30 in the scenario of FIG. 2. Other than the fact that sequence detector 40 and sequence detector 58 are in different stations, the structure and operation of sequence detector 40 and sequence detector 58 are substantially the same. Therefore, subsequent reference to a "receiving station" is to be understood, unless otherwise indicated by context, to be generic and thus applicable to either of base station node 28 or wireless terminal 30. Similarly, subsequent reference to a "sequence detector" is to be understood, unless otherwise indicated by context, to be generic and thus applicable to either or sequence detector 40 or sequence detector 58.

Figure 3:
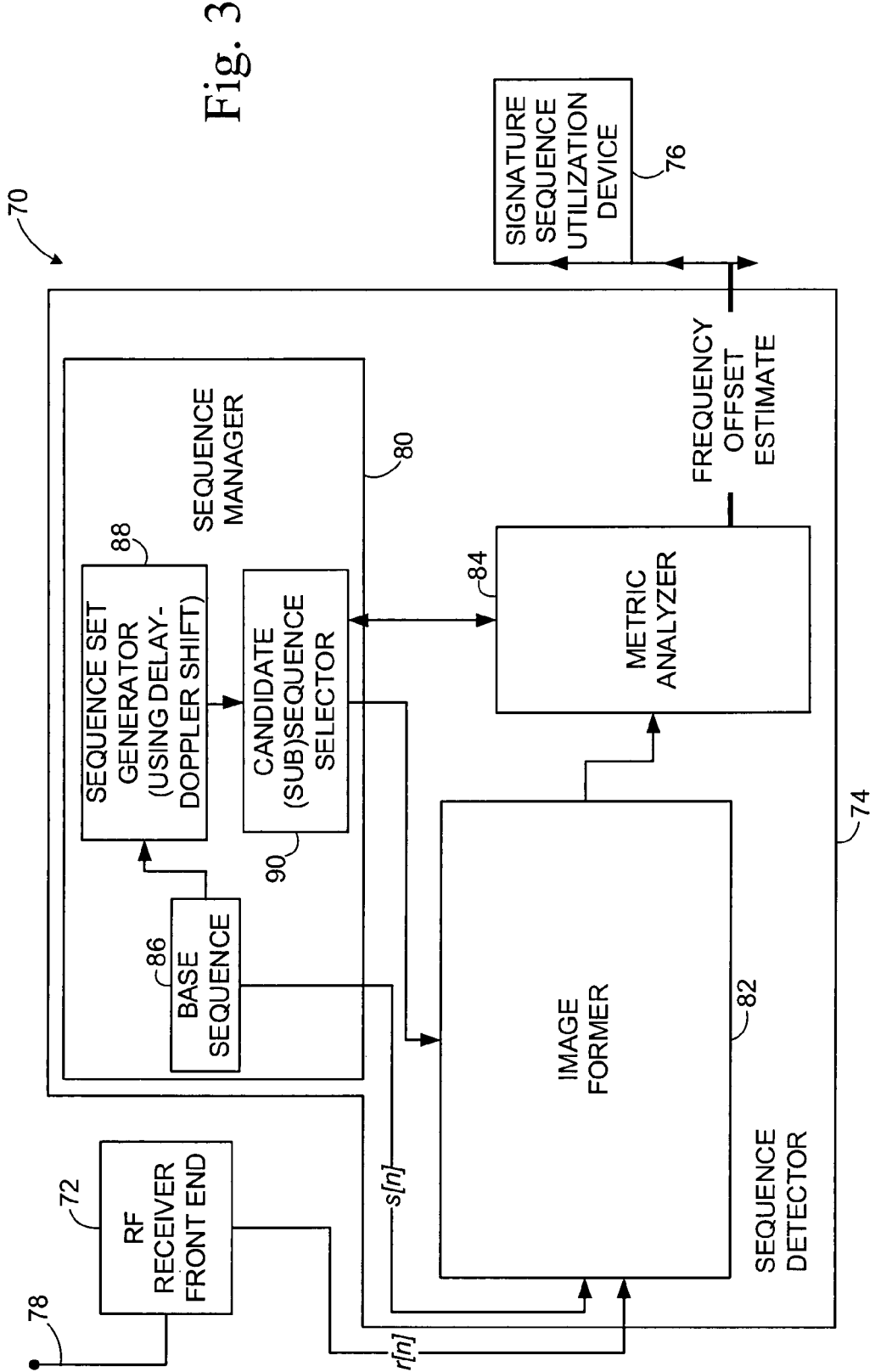
FIG. 3 is a diagrammatic view of an example receiving station according to a first example embodiment.

FIG. 3 shows a receiving station 70 according to a first example embodiment. The receiving station 70 comprises RF receiver front end 72 (also known as transceiver 72); sequence detector 74; and sequence utilization device 76. The RF receiver front end 72 is connected to antenna 78 and performs conventional front end processing such as amplification and filtering, for example. The RF receiver front end 72 outputs a received signal r[n] as a first input to sequence detector 74.

The sequence detector 74 comprises sequence manager 80; image former 82; and metric analyzer 84. The sequence manager 80 comprises a base sequence memory or repository 86; a sequence set generator 88; and, candidate sequence selector 90. The base sequence s[n] stored in base sequence memory 86 is applied as a second input to sequence detector 74.

In one of its aspects, the technology involves utilization and/or detection of a signature sequence employed in a wireless transmission over a channel. The signature sequence is selected from a set of sequences formed by delay-Doppler shifts of a base sequence. The base sequence is stored in base sequence memory 86. The base sequence can be, for example, an m-sequence. The base sequence is applied to sequence set generator 88, which generates the set of sequences formed by delay-Doppler shifts of the base sequence in an example manner hereinafter described. Preferably but not exclusively, the set of sequences formed by sequence set generator 88 is formed by circular delay-Doppler shifts of the base sequence.

The base sequence can be an arbitrary base sequence s[n] of length-N From this base sequence, a set of sequences is derived by sequence set generator 88 by introducing a circular delay-Doppler shift to the base sequence according to Expression (8).

$$s_{l,m}[n] = s[n - l\tau_d]e^{j\frac{2\pi m v_d n}{N}}, \quad (8)$$

In Expression 8, $(\tau_d, v_d)$ is the minimum delay-Doppler separation between any pair of derived sequences and (l, m) is the unique identification index associated with the derived sequence. The frequency-resolution in the sequence set is 1/N. This sequence therefore differs from that described in U.S. provisional patent application 60/884,703, filed Jan. 12, 2007, entitled "A NOVEL SIGNATURE SEQUENCE DESIGN FOR TIME-FREQUENCY SELECTIVE CHANNEL", in which the sequence is divided into several segments of length M and the frequency resolution is 1/M.

If the selected base sequence has an ideal ambiguity function, each sequence in the set can be uniquely identified even after passing through a time-frequency selective channel as long as the minimum delay-Doppler separation $(\tau_d, v_d)$ is greater than the channel's maximum delay-Doppler spread $(\tau_{max}, v_{max})$. The following discloses a specific example of such an ideal sequence.

A BPSK (±1) modulated m-sequence s[n] has the special property that the product $s[n]s^*[n-\tau]$ is another m-sequence for any nonzero integer $\tau$. Furthermore, the Discrete Fourier Transform (DFT) of an m-sequence is given by Expression (10).

$$\left| \sum_{n=0}^{N-1} s[n]e^{-j\frac{2\pi nk}{N}} \right| = \begin{cases} 1, k=0 \\ \sqrt{N+1}, k \neq 0 \end{cases} \quad (10)$$

Figure 4:
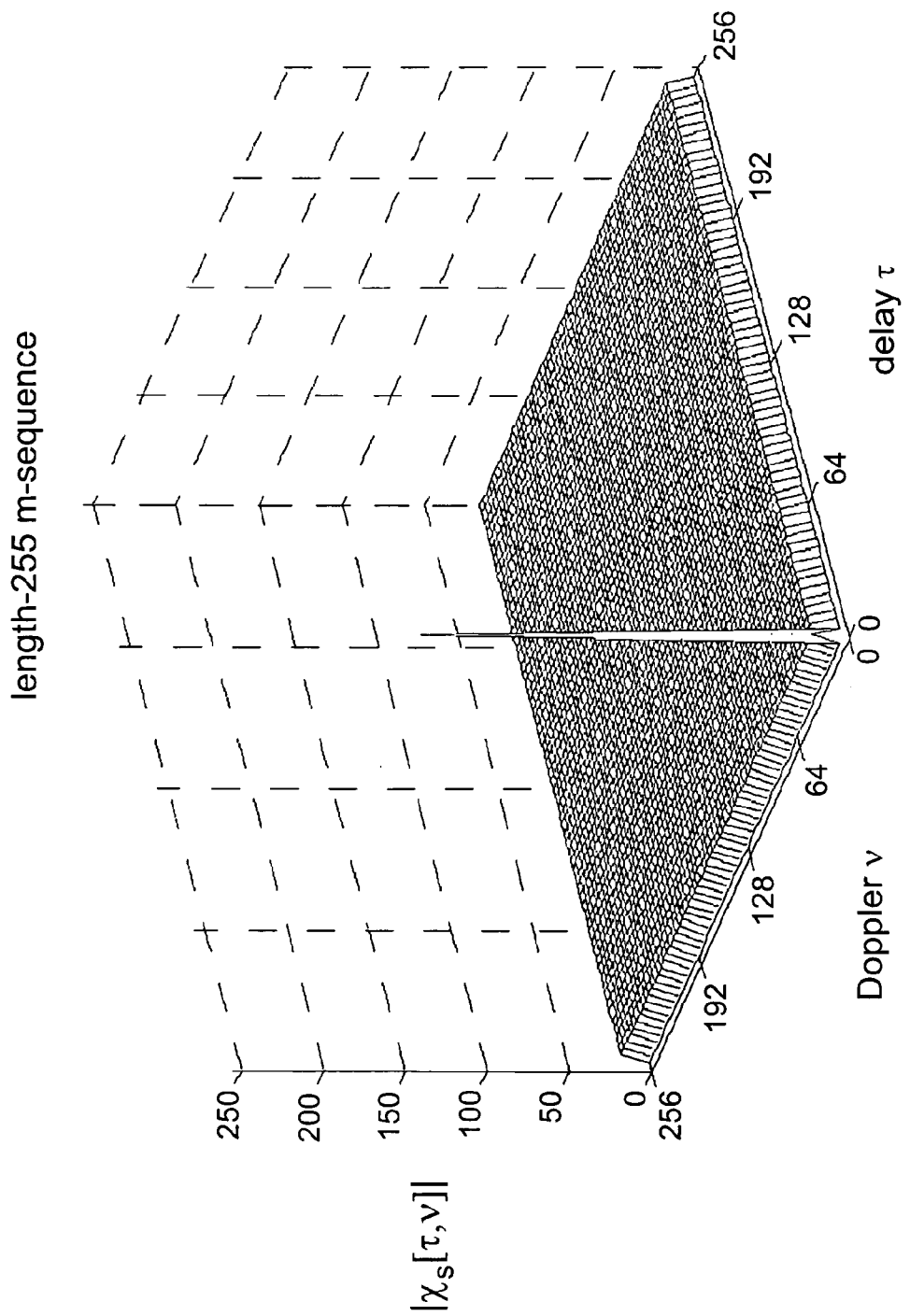
FIG. 4 is a three dimensional graph showing an ambiguity function of an m-sequence for N=255.

Therefore, the ambiguity function of an m-sequence, as shown in FIG. 4 for N=255, has a mainlobe to sidelobe ratio as specified in Expression 10 throughout the entire delay-Doppler plane except for the two axes along zero delay and zero Doppler where it is ideal.

$$\frac{X_s[0, 0]}{|X_s[\tau, v]|} = \frac{N}{\sqrt{(N+1)}} \quad (11)$$

In other words, the cross-correlation between any pair of sequences in the set of $N^2$ distinct sequences derived from a length-N m-sequence is at most $\sqrt{N+1}$, and thus essentially the same as that of a Zadoff-Chu sequence set, but without the frequency ambiguity. This is also a better alternative to the N+2 Gold sequences derived from a pair of preferred m-sequences with a maximum cross-correlation of $\sqrt{2N}$.

Figure 5:
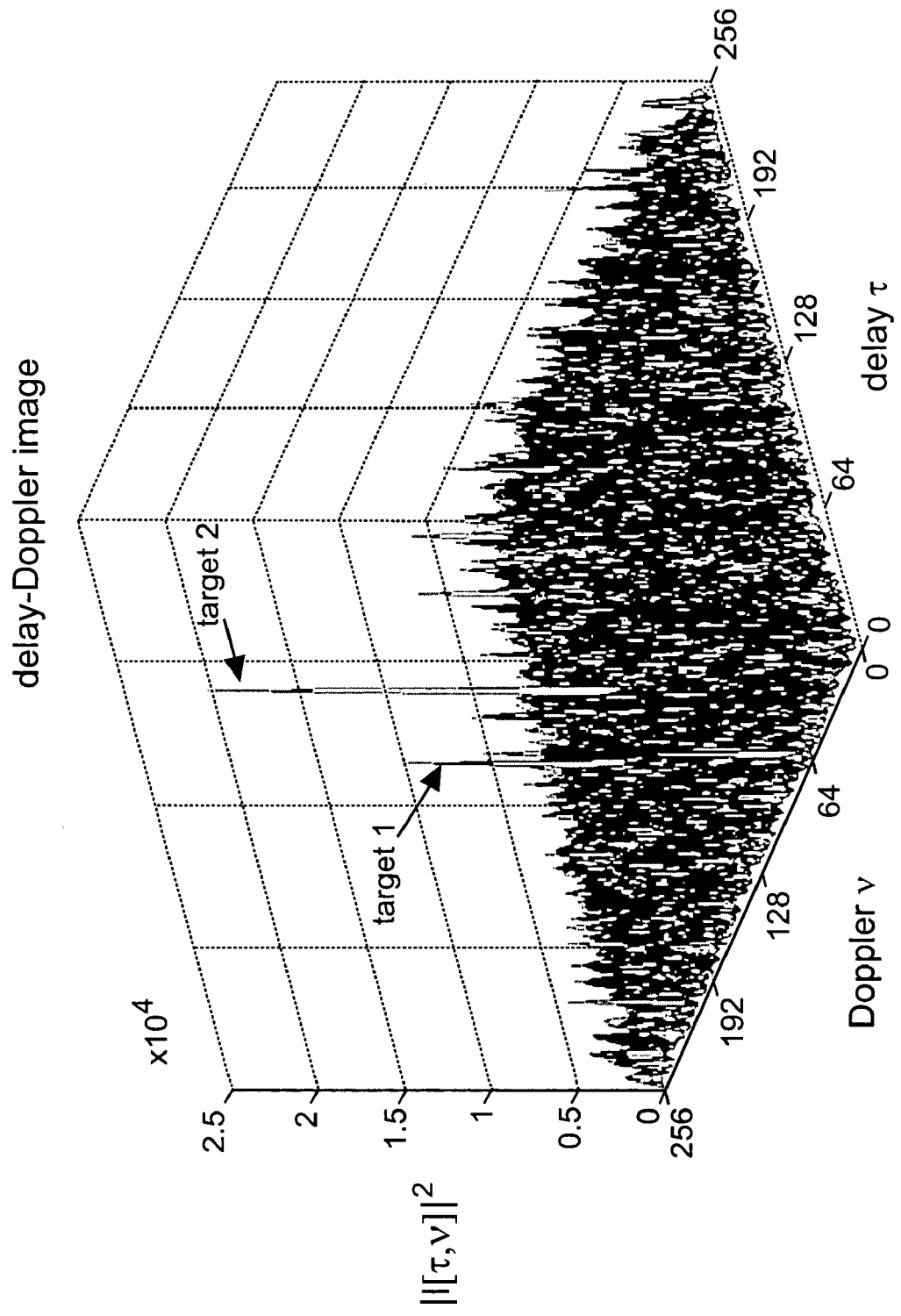
FIG. 5 is a three dimensional graph showing an example where two sequences of different delay-Doppler shifts are present in the system.

From Expression (6) it can be seen that the time-frequency selective channel expands the ambiguity mainlobe in the delay-Doppler domain. FIG. 5 shows an example where two sequences of different delay-Doppler shifts are present in the system. Visually, as long as the delay-Doppler image footprints of the multiple sequences do not overlap with each other, they can be uniquely distinguished and identified. The number of available ambiguity-free sequences is therefore limited by $N^2/(\tau_{max} \times v_{max})$. In practice, it may sometimes be desirable to choose a sequence length long enough to cover several times the maximum number of devices in the system such that subsets of the sequences can be reused by multiple adjacent systems.

Figure 6:
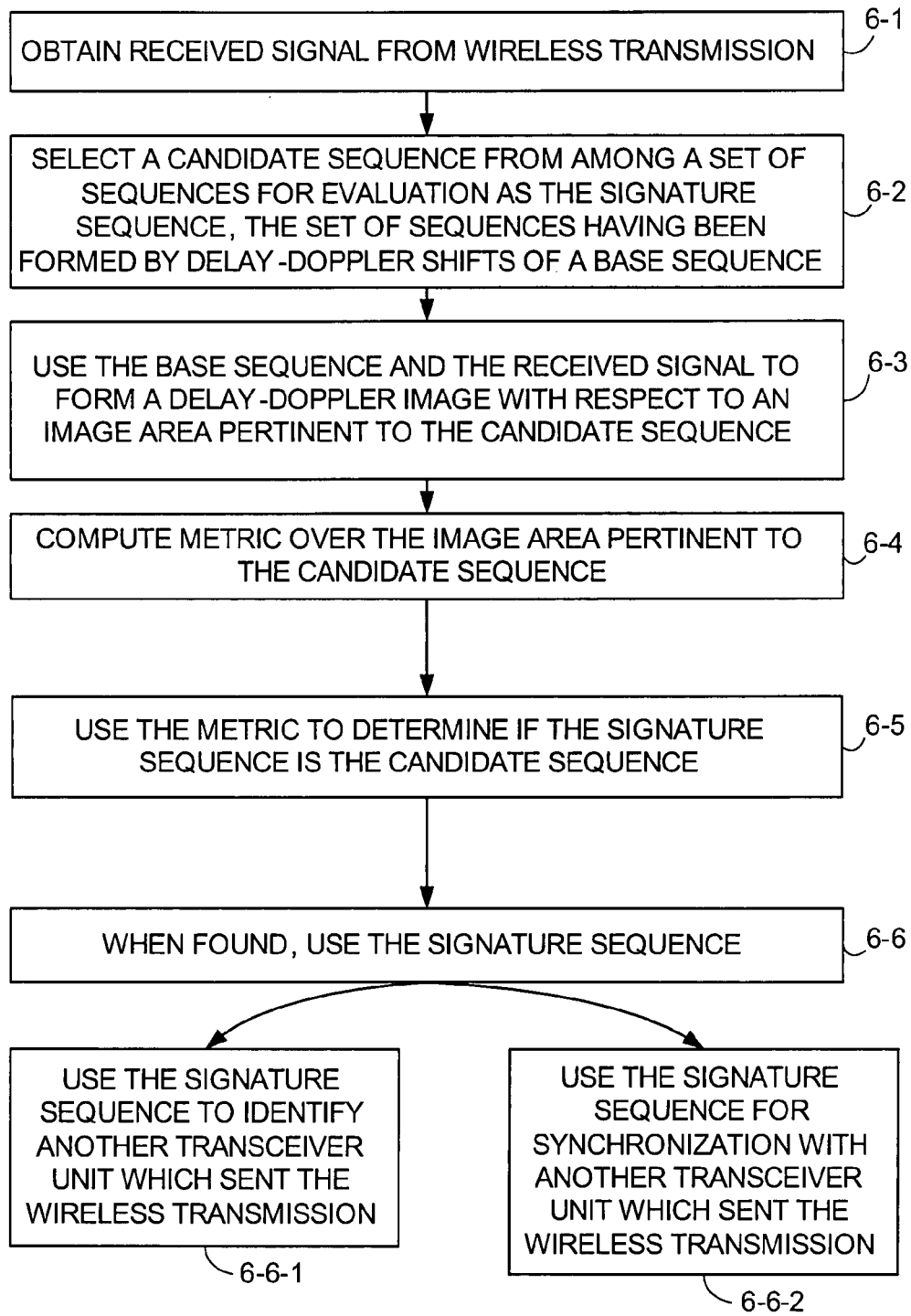
FIG. 6 is a flowchart showing representative, basic, acts or steps involved in an example method of operating a wireless network comprising the receiving station of FIG. 3.

Now that the generation of the set of sequences as performed by sequence set generator 88 has been described, attention is directed to FIG. 6 as showing representative, basic, acts or steps involved in an example method of operating a wireless network comprising receiving station 70 with its sequence detector 74. The example method of FIG. 6 comprises, as act 6-1, obtaining, at a transceiver unit, the received signal r[n] from a received wireless transmission. FIG. 3 shows the received signal r[n] being applied from RF receiver front end 72 as a first input to image former 82.

Act 6-2 involves selecting a candidate sequence from among the set of sequences (generated by sequence set generator 88 from base sequence memory 86 in the manner already described) for evaluation as the signature sequence. One by one the sequences comprising the set of sequences generated by sequence set generator 88 are utilized as the candidate or "hypothesis" sequence in an effort to evaluate or determine which of the sequences of the set matches a pattern in the received signal r[n].

Act 6-3 comprises using the base sequence and the received signal to form a delay-Doppler image with respect to an image area pertinent to the candidate sequence. Formation of the delay-Doppler image is performed by image former 82, which receives as its second input the base sequence s[n] from base sequence memory 86.

Act 6-4 comprises the metric analyzer 84 computing a metric over the image area pertinent to the candidate sequence. A metric is computed for each sequence of the set that is tried as the candidate sequence. The portion of the image pertinent for each candidate sequence differs from candidate to candidate.

Act 6-5 comprises using the metric to determine if the signature sequence is the candidate sequence. In essence, act 6-5 involves the metric analyzer 84 comparing the metric computed for the candidate sequence to a threshold or predetermined value which indicates a match between the pattern in the received signal r[n] and the candidate sequence, a successful match being an indication that the candidate sequence is the signature sequence included in the received signal.

As indicated by optional act 6-6, the method can further comprise a device or functionality of receiving station 70 represented by sequence utilization device 76 using the signature sequence. To this end, FIG. 6 shows subact 6-6-1 and subact 6-6-2, which can be optionally performed, either alternatively or in combination. Subact 6-6-1 comprises using the signature sequence to identify another transceiver unit which sent the wireless transmission. For example, in the scenario of FIG. 1, subact 6-6-1 comprises base station node 28 using the signature sequence to identify which wireless terminal 30 sent the wireless transmission. In the scenario of FIG. 2, subact 6-6-1 comprises wireless terminal 30 using the signature sequence to identify which base station node 28 sent the wireless transmission. Subact 6-6-2 comprises using the signature sequence for synchronization with another transceiver unit which sent the wireless transmission.

In developing its metric, metric analyzer 84 utilizes a generalized likelihood function. Assuming that the only channel information available is the maximum delay-Doppler spread $(\tau_{max}, v_{max})$, the optimal detection of a single sequence is to evaluate the generalized likelihood function of Expression (12) for all hypotheses of [l, m].

$$\gamma[l, m] = \sum_{\gamma=l\tau_d}^{l\tau_d+\tau_{max}-1} \sum_{v=mv_d}^{mv_d+v_{max}-1} |I[\tau, v]|^2, \quad (12)$$

$$I[\tau, v] = \sum_{n=0}^{N-1} r[n]s^*[n-\tau]e^{-\frac{j2\pi vn}{N}} \quad (13)$$

In Expression (12), Expression (13) is the delay-Doppler image defined over $0 \leq \tau < N$, $0 \leq v < N$. The image former 82 is thus configured to form the delay-Doppler image according to Expression (13). The metric analyzer 84 in essence calculates the metric by forming a number which is essentially the sum of numbers in a portion of the image that is pertinent to the candidate sequence. The metric analyzer 84 uses the hypothesis (e.g., the candidate sequence) with the largest log-likelihood is as the transmitted sequence. As shown in FIG. 3, the metric analyzer 84 outputs the candidate sequence selected as the signature sequence to sequence utilization device 76. In addition, and as of collateral interest, metric analyzer 84 can also provide outputs in the form of a timing offset estimate and a frequency offset estimate.

Even though the metric given in Expression (12) is optimal only when there is exactly one sequence in the system, it can also be used to detect multiple sequences if proper normalization and thresholding are employed.

The example embodiment of FIG. 3 thus involves a novel signature sequence design that is suitable for the time-frequency selective radio channel. Worded differently, in an example implementation the example embodiment of FIG. 3 and the example method of FIG. 6 involve or comprise selecting an appropriate base sequence of length-N (an m-sequence in particular is a preferred choice); forming (using, e.g., sequence set generator 88) a set of $N^2$ sequences by introducing circular delay-Doppler shifts as described by Expression (8); selecting the minimum delay-Doppler spacing $(\tau_d, v_d)$ so that it is greater than the channel's maximum delay-Doppler spread; and assigning each device a sequence with unique index pair (l,m). The transmitting devices can thus be identified and detected using a two-dimensional delay-Doppler correlator such as that understood with reference to Expression (12).

It will be appreciated that the generation of signature sequences for assignment to stations, such as by signature sequence generator 33 of FIG. 1, is performed in essentially the same manner as above described with respect to formation of the set of sequences generated by sequence set generator 88.

The example embodiment of FIG. 3 and the example method of FIG. 6 have numerous advantages over conventional practice. Such advantages include essentially no frequency ambiguity (perfect for a time-frequency selective channel); a large number of sequences are in the set ($N^2$), thereby facilitating use with many stations; and, ideal and uniform cross correlation between any pair of sequences at any lag.

Figure 8:
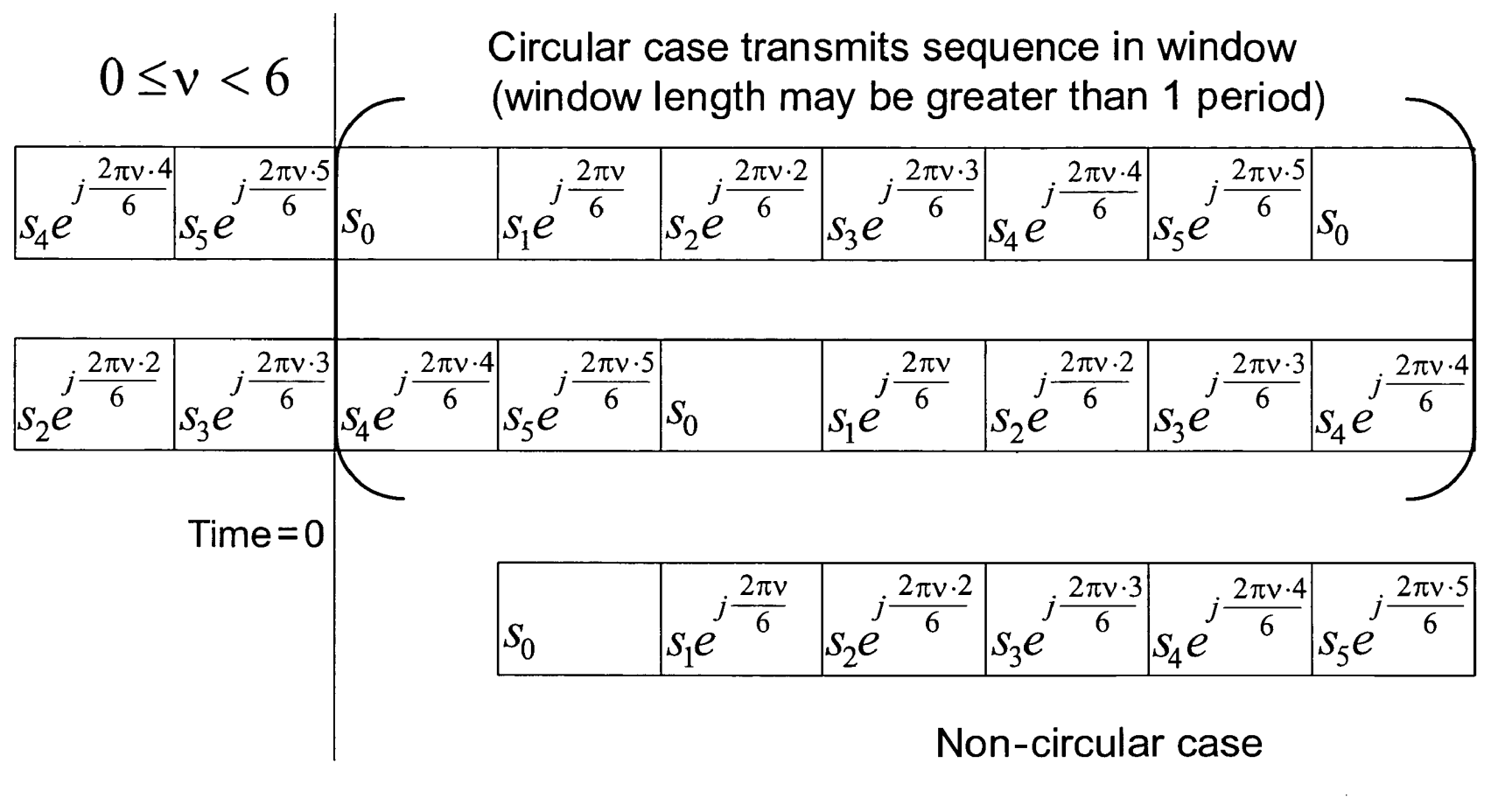

Reference has been made above to introducing circular delay-Doppler shifts. FIG. 8 illustrates in contrasting fashion both a circular shifting case and a non-circular case.

Further embodiments described herein involve obtaining (from the set of sequences generated by a sequence set generator) a subset of sequences which simplify detection of the signature sequence by, e.g., facilitating use of a simpler detector structure. Thus, a first aspect of these further embodiments pertains to the selection of a subset of the $N^2$ sequences of the specially-constructed delay-Doppler shifted sequence set to facilitate more efficient computation of the detection metric. A second aspect of these further embodiments, facilitated by the first aspect) relates to implementation of algebraic techniques (such as Discrete Fourier Transform (DFT)) that exploit such prudent sequence assignment strategy. As an advantageous variation, for a particular class of base sequences that can be represented by segments of equal-length sinusoids, even greater complexity reduction can be achieved by segmenting the delay-Doppler correlation accordingly and reusing past outcome in subsequent overlapping segments.

Figure 7:
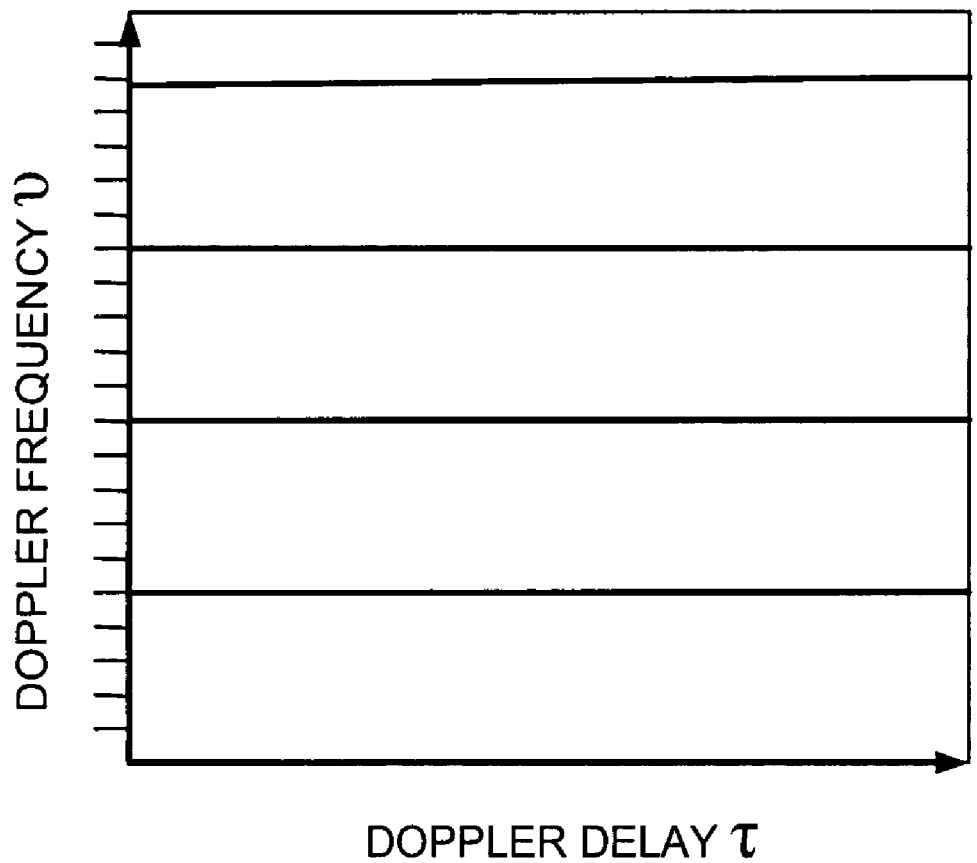
FIG. 7 is a diagrammatic view illustrating equally spaced sequences of a set.

Thus, a first aspect of the technology of the ensuing example embodiments involves selecting the candidate sequence from a subset of a set of sequences, the set of sequences being derived by a delay-Doppler shifting of the base sequence (e.g., essentially in the manner previously described). In an example embodiment and mode, the subset preferably comprises equally spaced sequences of the set. In this regard, FIG. 7 illustrates what is meant by equally spaced sequences of the set. The x-axis of FIG. 7 corresponds to delay $\tau$, the y-axis of FIG. 7 corresponds to Doppler (frequency) $v$. Each Doppler frequency value $v$ of FIG. 7 thus represents a sequence. However, FIG. 7 shows that only selected equally spaced sequences (corresponding to darkened horizontal lines in FIG. 7) are selected for the subset of sequences according to an example implementation.

If the subset of sequences selected from the specially constructed set includes only a small subset of the Doppler indices and all available delay indices in each of the valid Doppler index, it may be more efficient to compute the detection metrics in the frequency domain. By introducing the notation $r_v[n] = r[n]\exp\{-j2\pi vn/N\}$, Expression (6) can be rewritten as Expression (14).

$$\begin{aligned} I[\tau, v] &= \sum_{n=0}^{N-1} r[n]s^*[n-\tau]e^{-\frac{j2\pi vn}{N}} \\ &= \sum_{n=0}^{N-1} r_v[n]s^*[n-\tau] \\ &= r_v[\tau] \otimes s^*[\tau], \end{aligned} \quad (14)$$

Expression (14) shows a (circular) convolution between $r_v[\tau]$ and $s^*[\tau]$. Taking the DFT of Expression (14) over the delay $\tau$ gives Expression (15).

$$F\{I[\tau, v]\} = \sum_{\tau=0}^{N-1} I[\tau, v] e^{-\frac{j2\pi\tau k}{N}} \quad (15)$$
$$= F\{r_v[\tau]\} F\{s^*[\tau]\}$$
$$= R[k-v]S^*[k],$$

In Expression (15) R[k] and S[k] are the DFT of r[n] and s[n] respectively. For a given Doppler index v, therefore, the delay-Doppler image can be computed in the discrete frequency domain and converted back to the delay domain with an Inverse DFT (IDFT) as shown by Expression (16).

$$I[\tau, v] = F^{-1}\{R[k-v]S^*[k]\} \quad (16)$$
$$= \frac{1}{N} \sum_{k=0}^{N-1} R[k-v] S^*[k] e^{\frac{j2\pi\tau k}{N}}.$$

Figure 9:
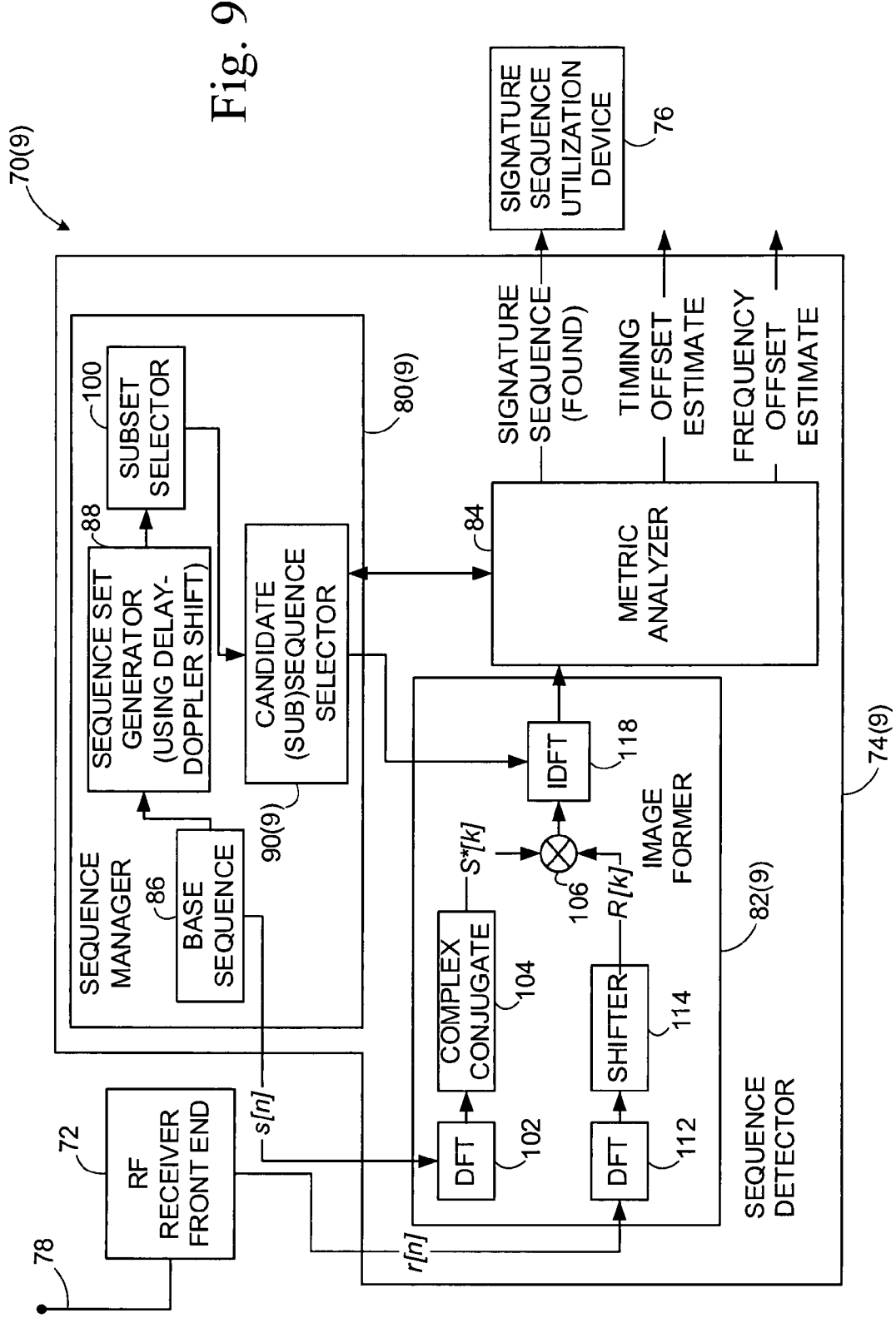
FIG. 9 is a diagrammatic view of an example receiving station according to a second example embodiment.

FIG. 9 illustrates an example embodiment of a transceiver unit 70(9) or receiving station configured to detect a signature sequence in conjunction with wireless transmission over a channel and to compute, in a frequency domain, a detection metric relative to a delay-Doppler image to determine whether the candidate sequence was received as a signature sequence in the received signal. The receiving station/transceiver unit 70(9) comprises a transceiver or RF front end 72; a hypothesis (or candidate) sequence selector 90(9); an image former 82(9); and a metric analyzer 84. Components or units of receiving station/transceiver unit 70(9) which have same or similarly numbered reference numerals to the components or units of transceiver unit 70 of FIG. 3 should be understood to have same or similar function, unless otherwise stated herein or apparent from the context.

The transceiver or RF front end 72 of transceiver unit 70(9) is configured to obtain a received signal from the wireless transmission comprising the signature sequence. The transceiver or RF receiver front end 72 is connected to antenna 78 and performs conventional front end processing such as amplification and filtering, for example. The RF receiver front end 72 outputs a received signal r[n] as a first input to sequence detector 74(9).

The sequence detector 74(9) comprises sequence manager 80(9); image former 82(9); and metric analyzer 84. The sequence manager 80(9) comprises a base sequence memory or repository 86; a sequence set generator 88; candidate sequence selector 90; and subset generator 100. The base sequence s[n] stored in base sequence memory 86 is applied as a second input to sequence detector 74(9). The sequence set generator 88 obtains, from the base sequence stored in base sequence memory 86, a subset in the manner previously described (e.g., with reference to FIG. 3). The subset generator 100 extracts, from the subset of sequences, a subset of sequences, and particularly a subset of sequences which facilitates computation, in a frequency domain, of a detection metric relative to the delay-Doppler image formed by image former 82 in an effort to determine whether the candidate sequence was received as a signature sequence in the received signal.

The candidate sequence selector 90(9), also known as the hypothesis sequence selector, is configured to select, one at a time, one of the sequences of the subset (as formed by subset generator 100) to be a candidate sequence for evaluation as the signature sequence. In other words, in the illustrated example embodiment, the plural sequences of the subset are individually and sequentially chosen by candidate sequence selector 90(9), one at a time, to be the candidate sequence so that the metric analyzer 84 can, for each sequence so sequentially chosen, obtain a corresponding detection metric relative to an area of the delay-Doppler image to which the respective candidate sequence pertains.

Image former 82(9) is configured to form a delay-Doppler image based on the received signal. In the particular example embodiment shown in FIG. 9, image former 82(9) forms a delay-Doppler image based on the received signal by determining an inverse discrete Fourier Transform of a product of (1) a complex conjugate of a discrete Fourier Transform of a base sequence from which the candidate sequence was derived, and (2) a version of a discrete Fourier Transform of a received signal. To this end, image former 82(9) comprises discrete Fourier Transform unit 102 which receives the base sequence s[n] from base sequence memory 86 and outputs a transformed sequence S[k]; complex conjugate former 104 which forms a complex conjugate S*[k] of its transformed input and applies the complex conjugate S*[k] as a first input to multiplier 106. The image former 82(9) further comprises discrete Fourier Transform unit 112 which receives the received signal r[n] from RF receiver front end 72 and outputs a transformed sequence R[k]; sequence shifter 114 capable of forming a circular shift of transformed sequence R[k] and which applies the possibly shifted transformed sequence R[k] to a second input of multiplier 106. The multiplier 106 thus forms the product of R[k] and S*[k], and outputs the product of R[k] S*[k] to an input of Inverse Discrete Fourier Transform Unit 118. The Inverse Discrete Fourier Transform Unit 118 is configured to evaluate Expression (16) in order to calculate the delay-Doppler image.

The metric analyzer 84 is configured to compute, at least in part in the frequency domain, a detection metric relative to the delay-Doppler image to determine whether the candidate sequence was received as a signature sequence in the received signal. The metric analyzer 84 is configured to compute the detection metric for each candidate (sub)sequence according to Expression (12). As explained herein after, metric analyzer 84, having computed a metric for each candidate (sub)sequence, is configured to choose as the signature sequence the particular candidate (sub)sequence having a best detection metric.

The example transceiver unit 70(9) of FIG. 9 further comprises signature sequence utilizer 76. In one example implementation, the signature sequence utilizer 76 comprises an identification unit configured to identify another transceiver unit which sent a wireless transmission including the signature sequence. For example, in the scenario of FIG. 1, sequence utilization device 76 of a base station node uses the signature sequence to identify which wireless terminal 30 sent the wireless transmission. In the scenario of FIG. 2, the sequence utilization device 76 of wireless terminal 30 uses the signature sequence to identify which base station node 28 sent the wireless transmission. In another or same implementation, signature sequence utilizer 76 alternatively or additionally comprises a synchronization unit configured to promote synchronization between the transceiver unit and another transceiver unit which sent a wireless transmission including the signature sequence.

Figure 10:
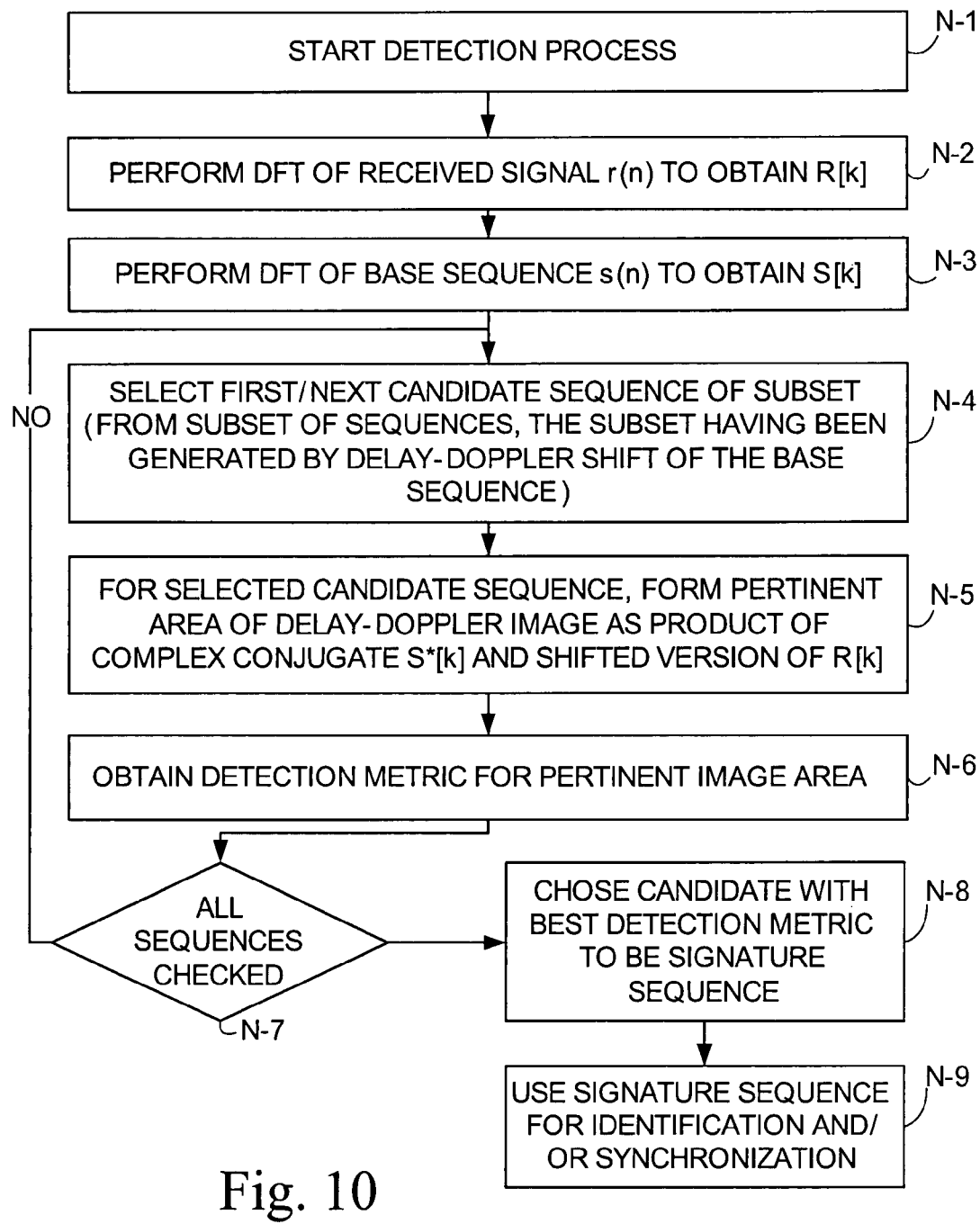
FIG. 10 is a flowchart showing representative, basic, acts or steps involved in an example method of operating a wireless network comprising the receiving station of FIG. 9.

FIG. 10 shows representative, basic, acts or steps involved in an example method of operating a wireless network comprising receiving station 70(9) with its sequence detector 74(9). Act 10-1 denotes start of a signature sequence detection process, which can begin (for example) upon obtaining, at transceiver unit 70(9), the received signal r[n] from a received wireless transmission. FIG. 9 shows the received signal r[n] being applied from RF receiver front end 72 as a first input to image former 82(9), and in particular to discrete Fourier Transform unit 112.

Act 10-2 depicts performing (by discrete Fourier Transform unit 112) a discrete Fourier Transform on receiver signal r[n] to obtain transformed sequence R[k]. Act 10-3 depicts performing (by discrete Fourier Transform unit 122) a discrete Fourier Transform on the base sequence s[n] obtained from base sequence memory 86.

Act 10-4 involves candidate sequence selector 90(9) selecting a candidate subsequence for evaluation as the signature sequence. In particular, for a first execution of a loop commencing at act 10-4 (hereinafter, "the loop"), act 10-4 comprises selecting a first candidate sequence of the subset generated by subset generator 100. For subsequent executions of the loop commencing at act 10-4, a next candidate sequence from the subset is chosen for evaluation. Thus, one by one the sequences comprising the subset of sequences are utilized as the candidate or "hypothesis" sequence in an effort to evaluate or determine which of the sequences of the subset matches a pattern in the received signal r[n]. The subsequence is generated by subset generator 100 from among the set of sequences (generated by sequence set generator 88 from base sequence memory 86 in the manner already described).

Act 10-5 comprises, for a selected candidate sequence of interest for a particular execution of the loop, forming a pertinent area of the delay-Doppler image as a product of the complex conjugate S*[k] and the shifted version of R[k]. As understood from FIG. 9, the complex conjugate S*[k] is obtained as the output of complex conjugate former 104 and the shifted version of R[k] is obtained from sequence shifter 114. The multiplication of the complex conjugate S*[k] and the shifted version of R[k] is performed by multiplier 106 and output to Inverse Discrete Fourier Transform Unit 118. The Inverse Discrete Fourier Transform Unit 118 forms the delay-Doppler image in accordance with Expression (16).

Act 10-6 comprises the metric analyzer 84 obtaining the detection metric for the pertinent area of the delay-Doppler image, e.g., the area of the delay-Doppler image which is pertinent to the particular candidate subsequence being evaluated during the current execution of the loop. The metric analyzer 84 determines the detection metric using, e.g., Expression (12).

Act 10-7 involves a check to determine whether all sequence of the subset have had their respective image areas formed and detection metrics computed. If sequences of the subset remain for image formation and metric evaluation, another execution of the loop is performed by branching back to act 10-4. After all sequences of the subset have had their metrics computed, as act 10-8 the metric analyzer 84 chooses the candidate having the best detection metric as the signature sequence for the received signal.

Act 10-9 shows the optional act of transceiver unit 70(9) using the signature sequence, either as an identifier or for synchronization purposes, as previously discussed.

Thus, computation of the delay-Doppler images over the area of interest involves the following:
1. a length-N DFT to convert the time domain received samples r[n] to R[k] in the frequency domain
2. For each Doppler index v
    (a) N multiplications for k=0, 1, ..., N−1 in Expression (15)
    (b) A length-N IDFT in Expression (16)

In addition to evaluating the delay-Doppler image, the detector (e.g., metric analyzer 84) needs to sum the magnitude of the image over the corresponding area for each hypothesis. This is a much simpler operation than the large number of multiplications involved in computing the delay-Doppler image. The number of multiplications is then approximately N+N log$_2$ N multiplied by the number of Doppler points.

The foregoing therefore discloses several methods for reducing the complexity of the detection of delay-Doppler shifted signature sequences. The following is a recap of example acts of steps of operation:
1. Selecting the sequence set that includes only a small subset of the Doppler indices and all available delay indices in each of the valid Doppler index.
2. The sequence detector 74(9) calculating and storing S[k], the DFT of the base sequence s[n].
3. The sequence detector 74(9) calculating and storing R[k], the DFT of the received samples r[n].
4. The delay-Doppler image is calculated by image former 82(9) according to Expression (16) as the IDFT of the product between the complex conjugate of S[k] and a shifted version of R[k].
5. The detection metrics are then calculated by metric analyzer 84 from the magnitude of the delay-Doppler image according to Expression (12).

Consequently, N+N log$_2$ N multiplications are performed per Doppler index, instead of N(N+N log$_2$ N) multiplications for the entire delay-Doppler image.

In a variation of the "subset" embodiment of FIG. 9, advantages such as even greater complexity reduction can be achieved by using a special class of base sequences to generate the set of sequences from which the subset is selected. In particular, the special class of base sequences are those which can be represented by segments of equal-length sinusoids. Use of base sequences which can be represented by segments of equal-length sinusoids facilitate reuse of a past outcome in subsequent overlapping segments.

The special structure of sequences comprising frequency hopping segments such as the ideal Costas sequence (utilized, in U.S. patent application Ser. No. 11/292,415, filed Dec. 2, 2005, entitled "HOPPING PILOT PATTERN FOR TELECOMMUNICATIONS (incorporated by reference herein in its entirety)) allows for even greater complexity reduction. Consider a sequence of length N=LQ consisting of L segments of sinusoid, each of length Q as shown in Expression (17).

$$s[n] = \sum_{l=0}^{L-1} p[n - lQ] e^{j\frac{2\pi v_l (n-lQ)}{Q}}, \qquad (17)$$

$$p[n] = \begin{cases} 1, & \text{for } 0 \le n < Q \\ 0, & \text{otherwise} \end{cases} \qquad (18)$$

In Expression (17), the term p[n] is defined by Expression (18). In Expression (17) $v_1$ may be an arbitrary hopping pattern ranging between 0 and Q−1. The Costas sequence is a special case where $v_1$ is a unique permutation of the Q consecutive integers {0, ..., Q−1} with a certain property.

To exploit the sinusoidal structure of the sequence, the delay-Doppler index can be decomposed into Expression (19).

$$[\tau, v] = [iQ + \delta_\tau, mL + \delta_v], \qquad (19)$$

In Expression (19) $0 \leq i < L$, $0 \leq \delta_\tau < Q$, $0 \leq m < Q$ and $0 \leq \delta_v < L$. The delay-Doppler image is then given by Expression (20).

$$I[iQ + \delta_\tau, mL + \delta_v] = \sum_{n=0}^{N-1} r[n]s^*[n - (iQ + \delta_\tau)]e^{-j\frac{2\pi(mL+\delta_v)n}{N}} \quad (20)$$

$$= e^{-j\frac{2\pi m \delta_\tau}{Q}} \sum_{l=0}^{L-1} \sum_{n=0}^{Q-1} r[n + (l+i)Q + \delta_\tau]$$

$$e^{-j\frac{2\pi \delta_v(n+(l+i)Q+\delta_\tau)}{N}} e^{-j\frac{2\pi(m+v_l)n}{Q}}$$

$$= e^{-j\frac{2\pi m \delta_\tau}{Q}} \sum_{l=0}^{L-1} \sum_{n=0}^{Q-1} \tilde{r}[n, l+i, \delta_\tau, \delta_v]e^{-j\frac{2\pi(m+v_l)n}{Q}},$$

$$\tilde{r}[n, l, \delta_\tau, \delta_v] = r[n']e^{-j\frac{2\pi \delta_v n'}{N}}\Big|_{n'=n+lQ+\delta_\tau} \quad (21)$$

In Expression 20, Expression (21) is a sequence of the index n defined over $0 \leq n < Q$. For a given $(\delta_\tau, \delta_v)$ the length-Q DFT of $r[n, l, \delta_\tau, \delta_v]$ is then calculated over the time index n for all $0 \leq l < L$ as shown by Expression (22).

$$\tilde{R}[k, l, \delta_\tau, \delta_v] = F_Q\{\tilde{r}[n, l, \delta_\tau, \delta_v]\} \quad (22)$$

$$= \sum_{n=0}^{Q-1} \tilde{r}[n, l, \delta_\tau, \delta_v]e^{-j\frac{2\pi k n}{Q}}$$

$$I[iQ + \delta_\tau, mL + \delta_v] = e^{-j\frac{2\pi m \delta_\tau}{Q}} \sum_{l=0}^{L-1} \sum_{n=0}^{Q-1} \tilde{r}[n, l+i, \delta_\tau, \delta_v]e^{-j\frac{2\pi(m+v_l)n}{Q}} \quad (23)$$

$$= e^{-j\frac{2\pi m \delta_\tau}{Q}} \sum_{l=0}^{L-1} \tilde{R}[(m + v_l) \bmod Q,$$

$$(l+i) \bmod L, \delta_\tau, \delta_v],$$

Expression (23) shows that the delay-Doppler correlation for all combinations of (i, m) when conditioned on a given ($\delta_\tau$, $\delta_v$) can be evaluated by selecting and summing the corresponding subset of L metrics in R. Since the computation takes and L length-Q DFT for a given ($\delta_{96}$, $\delta_v$), the total number of multiplications for evaluating all points on the delay-Doppler plane is approximately $L \times Q \times (LQ \log_2 Q) = N^2 \log_2 Q$ assuming that Q is a power of 2.

Finally, by carefully examining Expression (22) it can be noted that the DFT is performed over a sliding window as the index $\delta_\tau$ advances. Therefore, the complexity can be further reduced by using sliding DFT of Expression (24).

$$\tilde{R}[k, l, \delta_\tau + 1, \delta_v] = \quad (24)$$

$$e^{j\frac{2\pi k}{Q}}(\tilde{R}[k, l, \delta_\tau, \delta_v] + \tilde{r}[0, l+1, \delta_\tau, \delta_v] - \tilde{r}[0, l, \delta_\tau, \delta_v]).$$

Figure 11:
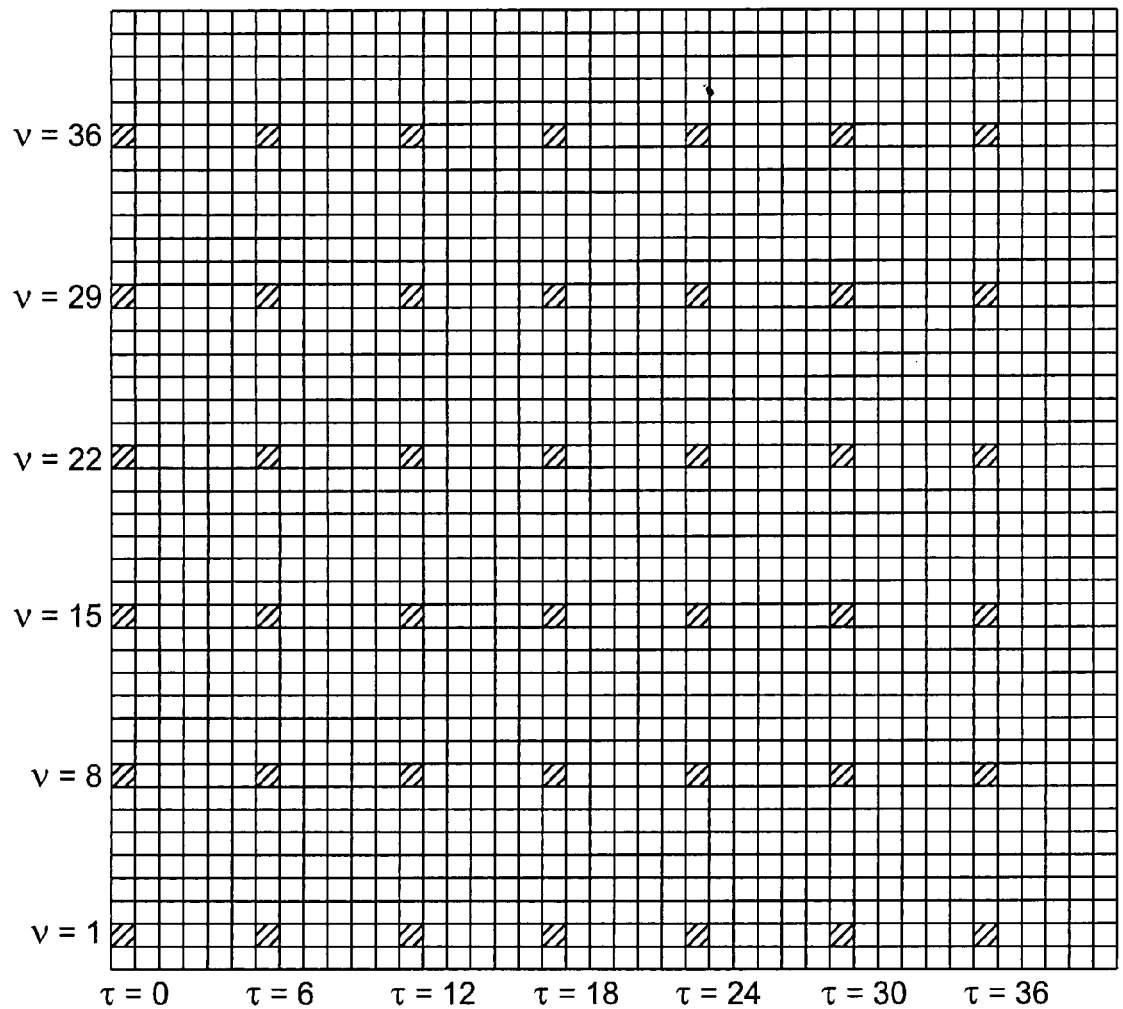
FIG. 11 is a diagrammatic view of an example sequence assignment for a frequency hopping sequence which is restricted to a subset of a given $\delta_v$.

In other words, the DFT of a windowed segment can be derived from that of the previous overlapping segment with simple operations of addition and phase rotation. The required computation is equivalent to performing N sliding DFT of length Q for all $\delta_v$, or approximately $N \times Q \times L = N^2$ multiplications. If the sequence assignment is restricted to the subset of a given $\delta_v$, as shown in FIG. 11, only a small number of $\delta_v$ need to be evaluated to cover the channel's Doppler spread.

In accordance with an advantageous variation, the base sequence is chosen to comprise a frequency hopping pattern having frequency hopping segments. From the chosen base sequence (having a frequency hopping pattern), a set of sequences are generated by delay-Doppler shift as previously described, and then from that set of sequences a subset is further chosen. Usage of the frequency hopping pattern for the base sequence beneficially provides even greater complexity reduction by segmenting the delay-Doppler correlation accordingly and reusing past outcome in subsequent overlapping segments.

Figure 12:
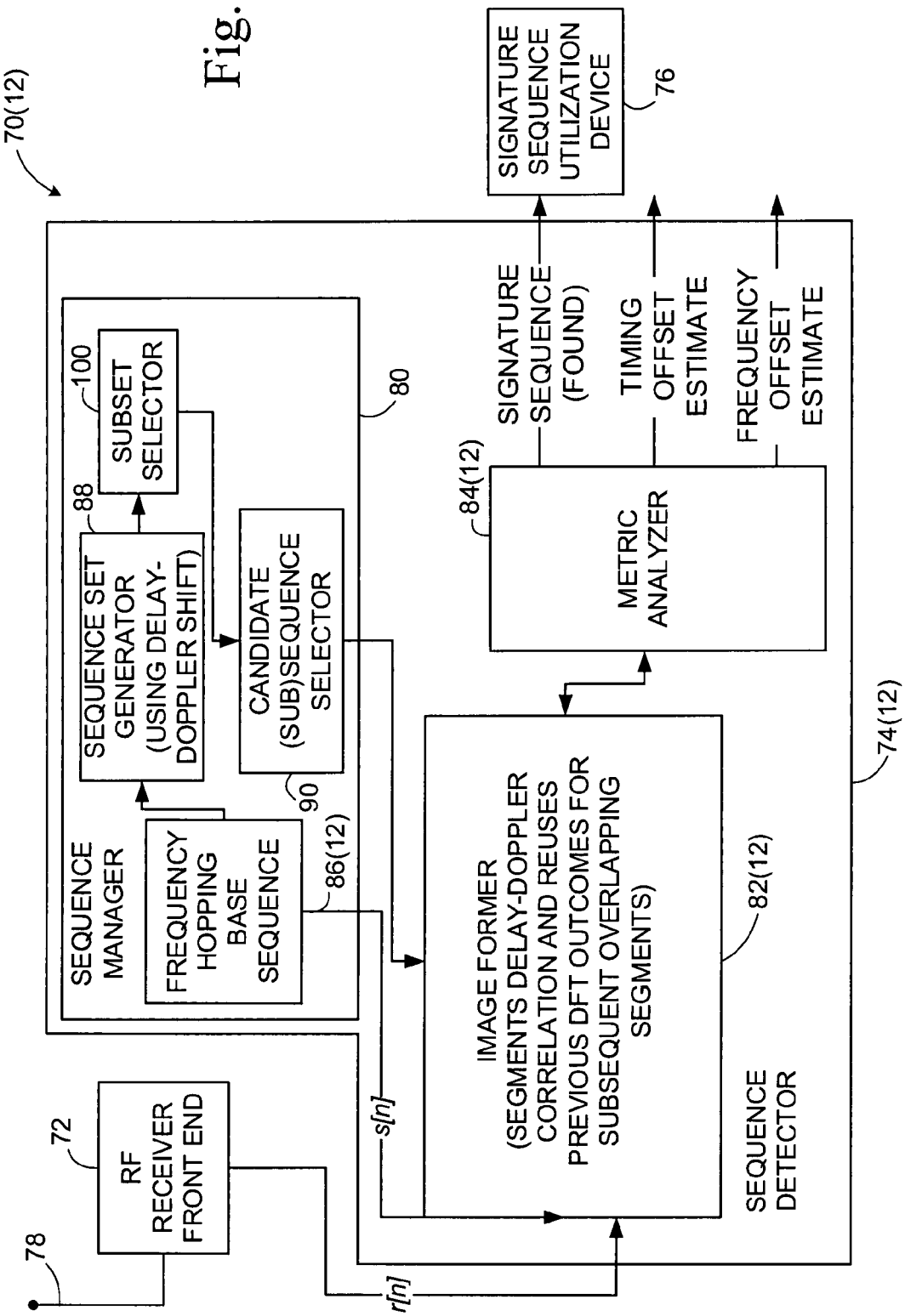
FIG. 12 is a diagrammatic view of an example receiving station according to another example embodiment.

FIG. 12 shows an example embodiment of a transceiver unit 70(12) or receiving station which differs from the receiving station of FIG. 9 by, e.g., using a frequency hopping sequence to form the candidate sequence and a simplified image former 82(12) which capitalizes upon usage of the frequency hopping sequence. The transceiver unit 70(12) comprises a sequence detector 74(12) which, in turn, comprises image former 82(12); and metric analyzer 84(12). Components or units of receiving station/transceiver unit 70(12) which have same or similarly numbered reference numerals to the components or units of transceiver unit 70(9) of FIG. 9 should be understood to have same or similar function, unless otherwise stated herein or apparent from the context.

Figure 13:
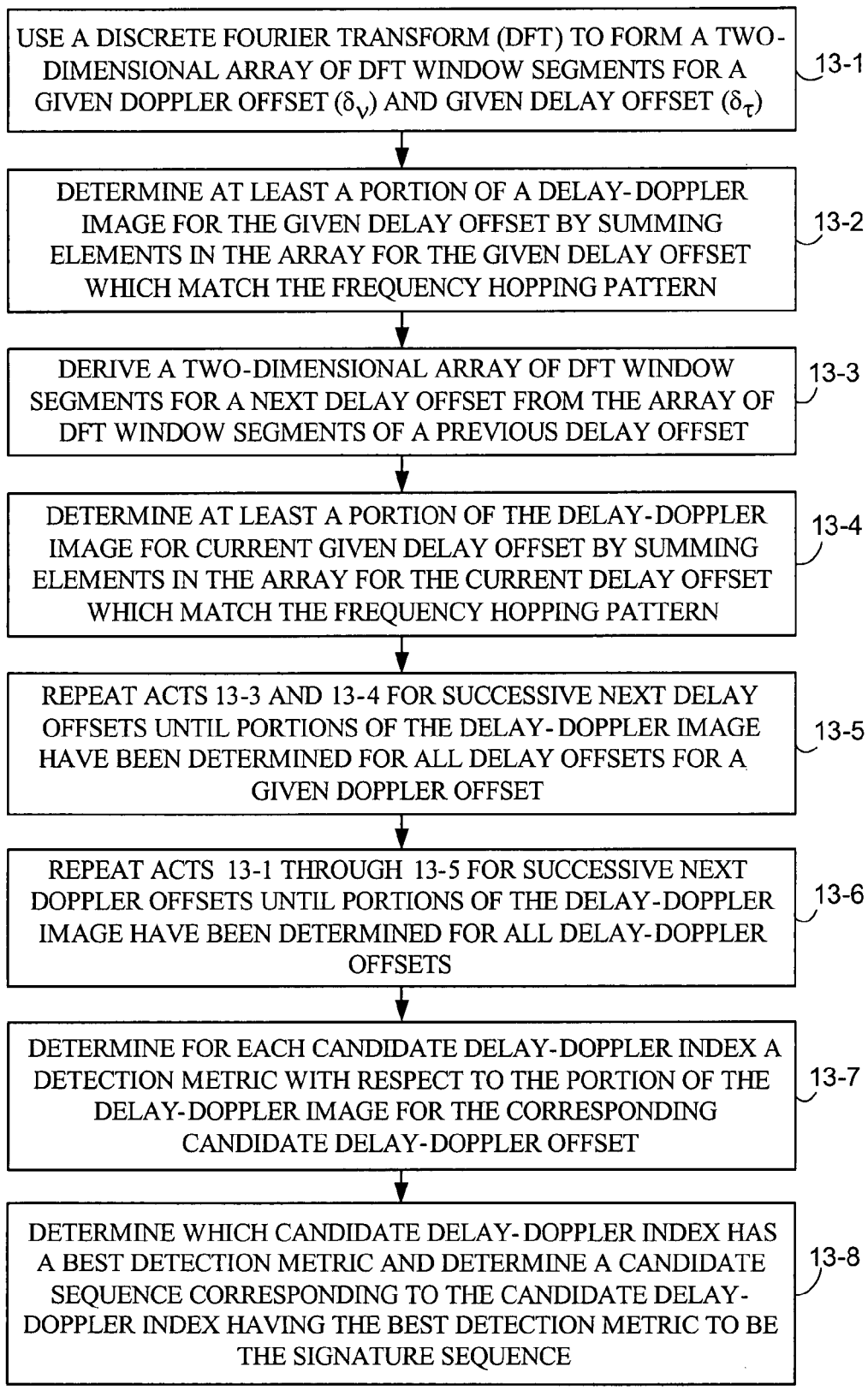
FIG. 13 is a flowchart showing representative, basic, acts or steps involved in an example method of operating a wireless network comprising the receiving station of FIG. 12.

FIG. 13 shows representative, basic, acts or steps involved in an example method of operating a wireless network comprising receiving station 70(12), and particularly acts performed by image former 82(12) and metric analyzer 84(12). In an example embodiment, act 13-1 through act 13-5 can be performed by image former 82(12), while act 13-6 though act 13-7 can be performed by metric analyzer 84(12).

Figure 14:
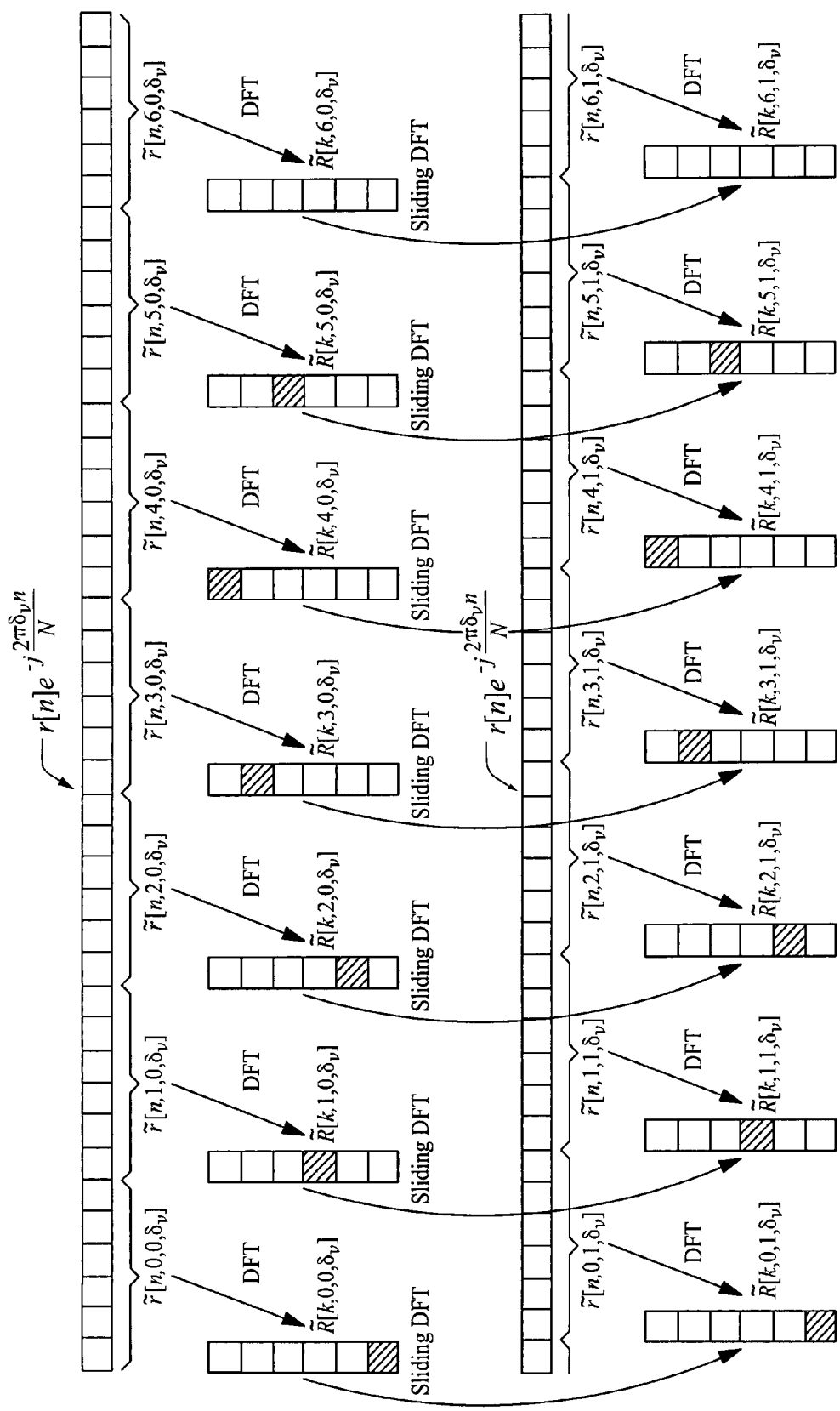
FIG. 14 is a diagrammatic view of an example shifting performing by a delay-Doppler correlator for a time-frequency hopping pattern at a given $\delta_v$.
Figure 15:
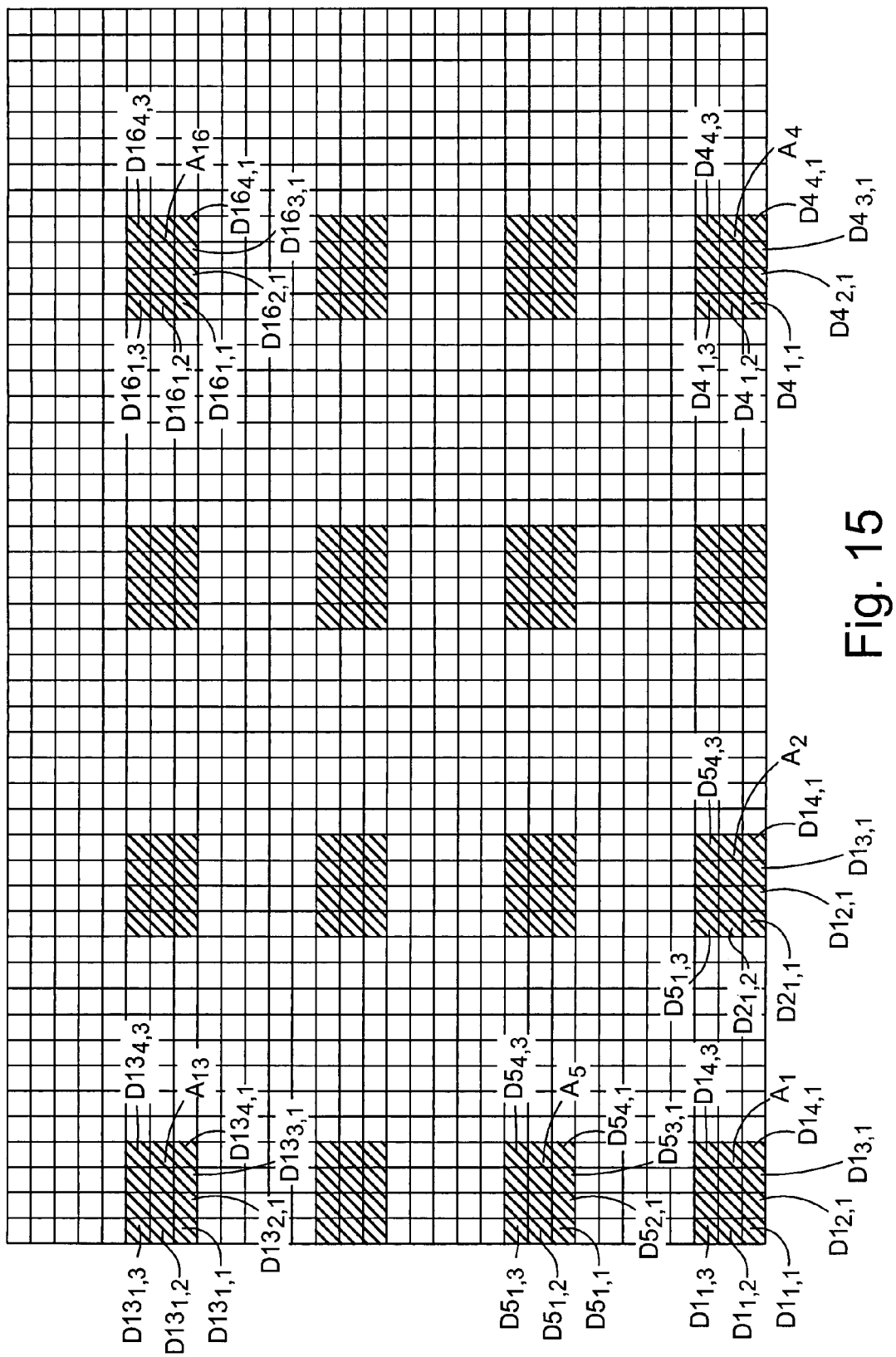
FIG. 15 is a diagrammatic view of a grid useful for explaining a delay-Doppler image.
Figure 16:
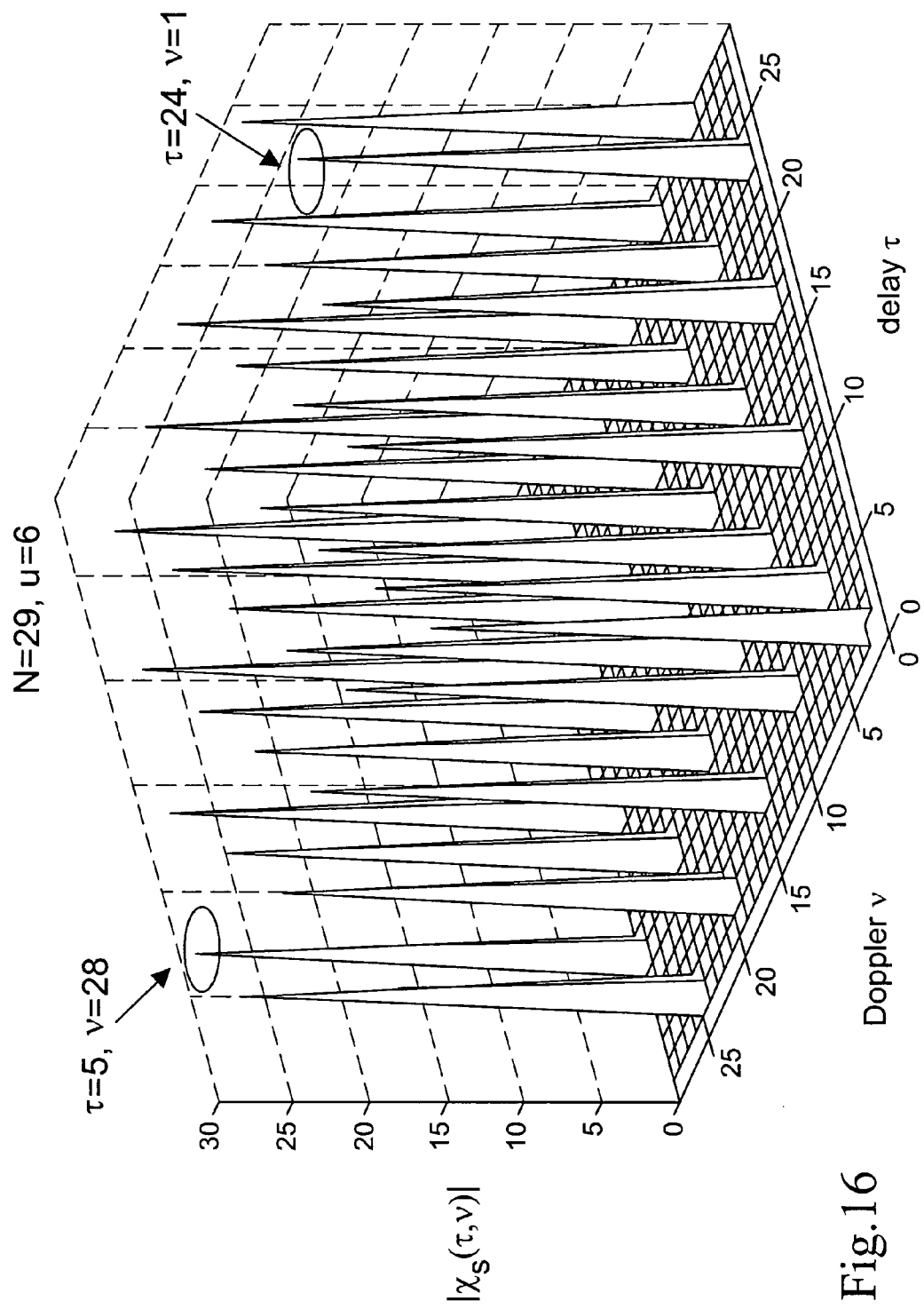
FIG. 16 is a three dimensional graph showing an ambiguity function of a length N=29 Zadoff-Chu sequence with u=6.

The acts of FIG. 13 are also understood with reference to FIG. 14 and 15. FIG. 15 is useful for explaining a delay-Doppler image and accordingly has a horizontal or delay ($\tau$) axis and a vertical or Doppler (v) axis. FIG. 15 in particular illustrates a grid whereon sixteen rectangular areas A are shaded, e.g., areas $A_1$ through $A_{16}$, each area A corresponding to an image area for a different candidate sequence. It will be appreciated that the grid of FIG. 15 having sixteen areas A is for sake of example, and that in other scenarios more or less areas (and thus more or less candidate sequences) can be provided. Further, each area A of FIG. 15 further comprises smaller subareas D arranged in the rectangular pattern to form the area. In the example shown in FIG. 15, twelve subareas D happen to be formed per area A. For example, area $A_1$ has subareas $D1_{1,1}$ through $D1_{4,3}$, area $A_2$ has subareas $D2_{1,1}$ through $D2_{4,3}$, and so forth. The number of subareas can differ (e.g., be greater or lesser) in other scenarios, the number twelve selected here only for sake of example. The subareas D of each area A are thus denominated by a pair of subscripts, the first subscript of the pair corresponding to relative position along the delay ($\tau$) axis and the second subscript of the pair corresponding to relative position along the Doppler (v) axis, both with respect to the lower left subarea of each area A. So denominated, it will be appreciated that each subarea is referenced relative to the lower left subarea of each area A by an offset ($\delta_\tau$, $\delta_v$).

Thus, each point (or pixel) on the delay-Doppler image has a delay-Doppler index that is its coordinate. Since each signature sequence is a delay-Doppler shifted version of the base sequence, each signature can be conveniently denoted (or indexed) by this unique shift. As mentioned above, the delay-Doppler image array comprises plural areas D, each area D corresponding to a unique candidate sequence and thus having a unique delay index $\tau$ and Doppler index v. Each area D further comprises plural subareas DX. Each subarea DX is described with respect to the lower left subarea of the same area by a delay-Doppler offset ($\delta_\tau$, $\delta_v$).

Act 13-1 begins a process of using a discrete Fourier Transform (DFT) to form a two-dimensional time-frequency array of DFT window segments for a given delay-Doppler offset according to Expression (22). Each segment is represented by a square in the lower half of FIG. 14. Act 13-1 specifically involves forming a two-dimensional array of DFT window segments for a given Doppler offset $\delta_v=1$, and a given delay offset $\delta_\tau=1$.

Act 13-2 comprises determining at least a portion of a delay-Doppler image for the given delay offset by summing elements in the two-dimensional array of DFT window segments for the given delay offset which match the frequency hopping pattern in the manner explained by FIG. 14. In other words, for each of the areas $A_1$-$A_{16}$ of FIG. 15, the delay-Doppler image for a first subarea along the $\tau$ axis is formed, e.g., subarea $D1_{1,1}$ for area $A_1$; subarea $D2_{1,1}$ for area $A_2$, and so forth up to subarea $D16_{1,1}$ for area D16

Act 13-3 comprises deriving a next two-dimensional array of DFT window segments for a next delay offset from the two-dimensional array of DFT window segments of a previous delay offset using a sliding DFT according to Expression (24).

Act 13-4 comprises determine at least a portion of the delay-Doppler image for the current given delay offset by summing elements in the two-dimensional array of DFT window segments for the current delay offset which match the frequency hopping pattern in the manner explained by FIG. 14. In other words, when the next delay offset (now the current delay offset) is $\delta_\tau=2$, the delay-Doppler image of a second subarea along the $\tau$ axis is formed for each area A, e.g., subarea $D1_{2,1}$ for area $A_1$; subarea $D2_{2,1}$ for area $A_2$, and so forth up to subarea $D16_{2,1}$ for area D16.

Act 13-5 comprises repeating acts 13-3 and 13-4 for successive next delay offsets until portions of the delay-Doppler image have been determined for all delay offsets of the given Doppler offset. In other words, when the Doppler offset is $\delta_v=1$, act 13-3 and 13-4 are performed for each of $\delta_\tau=1$, $\delta_\tau=2$, $\delta_\tau=3$, $\delta_\tau=4$. This means that during a next repetition of acts 13-3 and 13-4, a third subarea along the $\tau$ axis is formed for each area A, e.g., subarea $D1_{3,1}$ for area $A_1$; subarea $D2_{3,1}$ for area $A_2$, and so forth up to subarea $D16_{3,1}$ for area D16. In yet a further repetition of acts 13-3 and 13-4, a fourth subarea along the $\tau$ axis is formed for each area A, e.g., subarea $D1_{4,1}$ for area $A_1$; subarea $D2_{4,1}$ for area $A_2$, and so forth up to subarea $D16_{4,1}$ for area D16.

Act 13-6 comprises repeating acts 13-1 through 13-5 for all successive Doppler offsets until all subareas in the delay-Doppler image pertinent to the candidate sequences have been determined. In other words, for the example scenario of FIG. 15, act 13-6 first involves repeating acts 13-1 through 13-5 for Doppler offset $\delta_v=2$ so that the delay-Doppler image for subareas $DX_{1,2}$ through $DX_{4,2}$ are successively formed for each of the sixteen areas. Since there are three possible values of the Doppler offset, act 13-6 further involves repeating acts 13-1 through 13-5 for Doppler offset $\delta_v=3$ so that subareas $DX_{1,3}$ through $DX_{4,3}$ are successively formed for each of the sixteen areas.

Act 13-7 comprises determining for each candidate delay-Doppler index and thus for each candidate sequence a detection metric with respect to the portion of the delay-Doppler image for the corresponding candidate delay-Doppler index. In other words, the metric analyzer computes a detection metric with respect to each area A of FIG. 15, i.e., one metric for area $A_1$, another metric for area $A_2$, and so forth.

Act 13-8 comprises determining which candidate delay-Doppler index has a best detection metric and thus determining a candidate sequence corresponding to the candidate delay-Doppler index having the best detection metric to be the signature sequence.

The candidate sequence can be selected to comprise Doppler delay indices that are multiples of L, the candidate sequence having a length N=LQ comprising L segments of sinusoid, each segment having length Q. For example, the candidate sequence can be selected to be an ideal Costas sequence. It may be advantageous in some implementations to restrict the subset of a given frequency offset $\delta_v$ so that only a small number of $\delta_v$ need be evaluated.

FIG. 14 shows an example of selected aspects of a delay-Doppler correlator (e.g., selected aspects of sequence detector 74(12)) for a time-frequency hopping pattern with Q=6 and L=7 at a given (but unspecified) offset $\delta_v$. To evaluate the delay-Doppler image over its entire range, the same operation shown in FIG. 14 needs to be carried out for each of the L=7 values of $\delta_v$ ($\delta_v=0, \ldots, 6$). In the beginning, the received samples r[n] are first phase rotated by $-2\pi\delta_v n/N$. At $\delta_\tau=0$, a length-6 DFT is performed for each of the 7 consecutive segments of length 6, as shown in the upper half of FIG. 14 (see Act 13-1 in FIG. 13). The resulting array of frequency domain samples contain all the values required to evaluate the delay-Doppler image at all combination of (i, m) for the given $(\delta_\tau,\delta_v)$ according to Expression. (23) (see act 13-2 of FIG. 13). As indicated by act 13-3 and 13-4 of FIG. 13, the same process is then executed for $\delta_\tau=1$ by circularly sliding the DFT windows to the right by one sample, as shown in the lower half of FIG. 14. Although the DFT over the new window position can be calculated directly from the new samples, it is more efficient, as pointed out in Expression (24), to derive it from the DFT of the previous window.

Once the delay-Doppler image $I[\tau,v]$ is evaluated over the desired area, as act 13-6 the detection metrics for the multiple hypotheses can be calculated by summing the magnitude of the delay-Doppler image according to Expression (12).

Thus, for a time-frequency hopping pattern, the method can involve:
1. Selecting the sequence set that includes only the Doppler indices that are multiples of L, with possibly an offset $\delta_v$, as illustrated by the example of FIG. Q.
2. The detector 74(12) evaluating the delay-Doppler image on the grid form by Expression (19) for a given $\delta_\tau$, and $\delta_v$. This evaluation in turn involves:
   (a) For a given $(\delta_\tau,\delta_v)$, a two-dimensional time-frequency array being calculated according to Expression (22) using the DFT (see act 13-1 of FIG. 13).
   (b) The delay-Doppler image on the grid being calculated by summing the elements in the array matching the time-frequency hopping pattern according to Expression (23) (see act 13-2 of FIG. 13).
   (c) The two-dimensional time-frequency array for a delay offset $\delta_\tau$ being calculated from the array corresponding to its preceding delay offset using a sliding DFT according to Expression (24) (see act 13-3 and act 13-4 of FIG. 13).
3. The detection metrics are then calculated from the magnitude of the delay-Doppler image according to Expression (12) (see act 13-6 of FIG. 13).

Advantageously, detector 74(12) requires only N multiplication per Doppler offset, a factor of $1+\log_2 N$ in the reduction of multiplication comparing with direct computation.

It should be appreciated that the functions of various components described herein can be performed by a processor or controller. For example, the functions of the various embodiments of sequence detectors described herein, including (separately or jointly) the functions of the various embodiments of the sequence managers, image formers, and metric analyzers can be performed by one or more processors and/or one or more controllers. The functions of a "processor" or "controller" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A transmitter comprising:
a processor configured to generate a plurality of signature sequences and to assign and to transmit the plurality of signature sequences to respective plural receivers for use by the receivers in conjunction with wireless transmissions over a channel, each of the signature sequences being selected from a set of sequences formed by delay-Doppler shifts of a base sequence;
wherein the set of sequences is represented by $$s_{l,m}[n] = s[n - l\tau_d]e^{j\frac{2\pi m v_d n}{N}},$$

wherein (l,m) is an index associated with a selected sequence;
wherein N is a length of the base sequence s[n];
wherein $(\tau_d, v_d)$ is a minimum delay-Doppler separation between any pair of derived sequences.

2. The apparatus of claim 1, wherein the minimum delay-Doppler $(\tau_d, v_d)$ separation is chosen to be greater than a maximum delay-Doppler spread of the channel.

3. A method of operating a wireless network comprising:
generating a plurality of signature sequences, each of the signature sequences being selected from a set of sequences formed by delay-Doppler shifts of a base sequence;
assigning the plurality of signature sequences to respective plural receivers and transmitting the plurality of signature sequences to the respective plural receivers for use by the receivers in conjunction with wireless transmissions over a channel,
wherein the set of sequences is represented by $$s_{l,m}[n] = s[n - l\tau_d]e^{j\frac{2\pi m v_d n}{N}},$$

wherein (l,m) is an index associated with a selected sequence;
wherein N is a length of the base sequence s[n];
wherein $(\tau_d, v_d)$ is a minimum delay-Doppler separation between any pair of derived sequences.

4. The method of claim 3, further comprising choosing the minimum delay-Doppler $(\tau_d, v_d)$ separation be greater than a maximum delay-Doppler spread of the channel.

5. A transceiver comprising:
a processor configured to utilize a signature sequence in conjunction with wireless transmission over a channel, the signature sequence being selected from a set of sequences formed by delay-Doppler shifts of a base sequence;
wherein the set of sequences is represented by $$s_{l,m}[n] = s[n - l_{\tau_d}]e^{j\frac{2\pi m v_d n}{N}},$$

wherein (l,m) is an index associated with a selected sequence;
wherein N is a length of the base sequence s[n];
wherein $(\tau_d, v_d)$ is a minimum delay-Doppler separation between any pair of derived sequences.

6. The apparatus of claim 5, wherein the minimum delay-Doppler $(\tau_d, v_d)$ separation is chosen to be greater than a maximum delay-Doppler spread of the channel.

* * * * *

UNITED STATES PATENT AND TRADEMARK OFFICE
CERTIFICATE OF CORRECTION

PATENT NO. : 8,295,325 B2
APPLICATION NO. : 11/760654
DATED : October 23, 2012
INVENTOR(S) : Guey It is certified that error appears in the above-identified patent and that said Letters Patent is hereby corrected as shown below:

In the Specifications

In Column 1, Lines 16-17, delete "TELECOMMUNICATIONS," and insert -- TELECOMMUNICATIONS", --, therefor.

In Column 2, Lines 22-23, delete "TELECOMMUNICATIONS," and insert -- TELECOMMUNICATIONS", --, therefor.

In Column 12, Line 26, delete "'Transform" and insert -- Transform --, therefor.

In Column 12, Line 55, delete "$r_v[n] - \equiv$," and insert -- $r_v[n] \equiv$ --, therefor.

In Column 15, Line 63, delete "domain" and insert -- domain. --, therefor.

In Column 15, Line 67, delete "(16)" and insert -- (16). --, therefor.

In Column 17, Line 42, delete "and L" and insert -- an L --, therefor.

In Column 17, Line 42, delete "($\delta_{96}$, $\delta_v$)," and insert -- ($\delta\tau$, $\delta_v$), --, therefor.

In Column 19, Line 18, delete "D16" and insert -- D16. --, therefor.

Signed and Sealed this
Sixteenth Day of July, 2013

Teresa Stanek Rea
*Acting Director of the United States Patent and Trademark Office*